(12) United States Patent
Bhagwat et al.

(10) Patent No.: US 7,139,268 B1
(45) Date of Patent: Nov. 21, 2006

(54) PERFORMANCE OF INTERMEDIATE NODES WITH FLOW SPLICING

(76) Inventors: Pravin Bhagwat, 40 Morrow Ave., #6TN, Scarsdale, NY (US) 10583; John Michael Tracey, 14 Ann Marie Pl., Yonkers, NY (US) 10703

( * ) Notice: Subject to any disclaimer, the term of this patent is extended or adjusted under 35 U.S.C. 154(b) by 0 days.

(21) Appl. No.: 09/240,374

(22) Filed: Jan. 29, 1999

(51) Int. Cl.
*H04L 12/28* (2006.01)

(52) U.S. Cl. .................................. 370/389; 370/389

(58) Field of Classification Search ............... 370/228, 370/254, 351, 389, 392, 393, 395.2, 395.21, 370/395.52, 395.7, 400, 401, 902, 903, 221, 370/222, 223; 340/825.01, 827, 825.06, 340/825.07; 713/200, 201
See application file for complete search history.

(56) References Cited

U.S. PATENT DOCUMENTS 5,245,604 A * 9/1993 Lacas et al. ................ 370/254
5,941,988 A * 8/1999 Bhagwat et al. ............ 713/201

\* cited by examiner

*Primary Examiner*—Duc Ho
*Assistant Examiner*—Phuongchau Ba Nguyen

(57) ABSTRACT

A method and apparatus for splicing a first data flow inbound to an intermediate node and second data flow outbound from the intermediate node transforms the first data flow and the second data flow into a single composite data flow originating at the source of the first data flow and terminating at the destination of the second data flow. The method allows any other data flows associated with the first or second data flow, such as other data flows associated with connections that encompass either the first or second data flow, to remain unaffected by the splice. The method allows intermediate nodes in a network to influence data flow between a pair of nodes at or above the transport layer without incurring all the overhead commonly associated with transport and higher layer processing.

58 Claims, 11 Drawing Sheets

PERFORMANCE OF INTERMEDIATE NODES WITH FLOW SPLICING

FIELD OF THE INVENTION

The invention is directed to communication via packet switched networks. It more particularly is directed to methods for improving the performance of intermediate network nodes that participate at or above the transport layer in communication between one or more node pairs.

BACKGROUND OF THE INVENTION

Traditionally, internet software has been developed in accordance with the principle that very limited functionality is provided in "the network." Specifically the network provides unreliable forwarding of messages or packets. Following this model, additional functionality, such as reliable delivery and flow control, is implemented entirely at communication end points without adding any functionality to the network.

FIG. 1 depicts a TCP connection between a first node 101 and a second node 102 following this model. The connection extends "directly" from the first node 101 to the second node 102 with only IP routers 103 in between. Routers do not maintain state information associated with constructs that reside above the network layer. Connection state, which is associated with the transport and session layer, is therefore maintained solely in the two connection end points, that is at the first node 101 and second node 102.

As internet technology has evolved, significant functionality has found its way into "the network." For example, it is increasingly common for a client running a web browser to connect to an intermediate node rather than directly to a web server. Such intermediate nodes include but are not limited to: SOCKS servers, fire walls, VPN (virtual private network) gateways, TCP routers or load balancers, caching proxies and transcoding proxies used with resource-constrained clients such as handheld devices.

The number and types of such intermediate nodes will continue to increase as internet technology evolves to provide additional functionality. The performance of the intermediate nodes will increase in importance as the number of internet clients continues to grow rapidly. This growth will be fueled by large numbers of handheld and pervasive devices that will require intermediate nodes capable of supporting hundreds of thousands to millions of clients simultaneously.

FIG. 2 depicts this increasingly common scenario in which a first node 201 connects to a second node 202 via a set of intermediate nodes 203. Although not explicitly depicted in the figure, intermediate nodes typically communicate with each other as well as with the first node and the second node via routers.

Each intermediate node influences communication between the first node 201 and the second node 202. In many instances, the interface provided by an intermediate node to the first node 201 resembles or is identical to the interface provided by the second node 202 to the intermediate node. Similarly, the interface provided by an intermediate node to the second node 202 is typically similar to the interface provided by the first node 201 to the intermediate node. Because of this similarity of interfaces, the first node may not be able to determine if it is connected to an intermediate node or to the second node. Similarly there may be no way for the second node to determine if it is connected to an intermediate node or to the first node. The similarity of interfaces allows there to be any number of intermediate nodes between the first node 201 and the second node 202. This property is depicted in FIG. 3.

A key difference between a router and an intermediate node is that routers perform processing only at layers one through three of the ISO seven layer model, those are the physical, data link and network layers, while intermediate nodes perform processing at and possibly above the fourth or transport layer. FIG. 4 depicts the processing performed by a router in terms of layers. The corresponding diagram for intermediate nodes is shown in FIG. 5.

We define a connection to be a bi-directional communication channel between a pair of connection end points such that information written to one end of the connection can be read from the other end. A connection includes two flows. A flow is a unidirectional communication channel between a pair of flow end points such that information written to the source flow end point can subsequently be read from the corresponding destination flow end point. A connection need not necessarily be supported by a connection oriented protocol. All that is required is the identification of a pair of connection end points and propagation of data between the end points. Connections and flows reside at the fifth or session layer in the ISO model. Because routers in general do not perform processing above layer three, routers generally do not perform processing explicitly related to connections. Intermediate nodes however do generally perform processing explicitly associated with connections.

In fact, intermediate nodes can be distinguished from routers in terms of connections. In FIG. 1, the first node 101 communicates with the second node 102 via a single connection 104 whereas in FIG. 2 communication between the two nodes takes place via multiple connections in series 204, 205, 206, 207, 208 and 209. The use of multiple connections provides each intermediate node with end points that can be used to influence communication between the first node 201 and the second node 202. However, intermediate nodes typically expend much of their resources simply moving data from one connection to another. In one common scenario, the intermediate node monitors the flow of information between the first node 201 and second node 202 only until a request made by the first node 201 can be identified. In another common scenario, the intermediate node monitors the flow of information only in one direction. The performance and capacity of an intermediate node is often determined therefore by the efficiency with which it moves data between connections.

Having a series of connections between the first and second node can cause several undesirable side-effects. Connections in series tends to deliver worse performance in terms of latency compared to a single connection and may also degrade throughput. Each node in a packet switched network introduces some delay and imposes a throughput limit. The performance of a packet switched network therefore relies on minimizing the delay introduced and maximizing the throughput supported by each node. This is accomplished, in part, by performing only minimal processing at each node. The packet forwarding performed by a router entails only a small amount of overhead, but the processing associated with connection end points performed by an intermediate node is significant.

The presence of multiple connections also alters the semantics of communication between the first node 201 and the second node 202 of FIG. 2. For example, with a single connection, the first node 201 is assured data has arrived at the second node 202 when it receives an acknowledgment. With multiple connections, the first node 201 may be led to believe data has arrived at the second node 202 when, in fact, it has only reached the first intermediate node.

SUMMARY OF THE INVENTION

It is therefore an object of the present invention to improve the performance of intermediate nodes using an approach called flow splicing. A flow splice transforms a pair of flows, a first flow inbound to an intermediate node and a second flow outbound from the intermediate node, into a single third composite flow that originates at the source of the first flow and terminates at the destination of the second flow. The transformation is invisible from the source node at which the first flow originated and the destination node at which the second flow terminated.

A flow splice is applied to a pair of flows in one direction between a first and second node independent of any associated flows. For example, a flow splice transforms one flow of a connection without modifying the other flow associated with the same connection. The unidirectional nature of a flow splice is an essential characteristic as techniques used to splice connections do not generally allow data flow to be spliced in one direction only. The ability to splice in one direction only greatly increases the number of scenarios in which splicing can be applied.

FIG. 6 depicts a flow splice. In this figure, a splice is performed at the intermediate node 1603 between the inbound flow from a first node 601 and the outbound flow to a second node 602. Flow splicing significantly improves network performance between nodes communicating via one or more network intermediaries and increase the capacity of the intermediaries.

BRIEF DESCRIPTION OF DRAWINGS

The foregoing and other objects, aspects and advantages of the invention may be better understood by referring to the following detailed description of a preferred embodiment with reference to the accompanying drawings, in which.

DETAILED DESCRIPTION OF THE INVENTION

Splice Architecture

Figure 1:
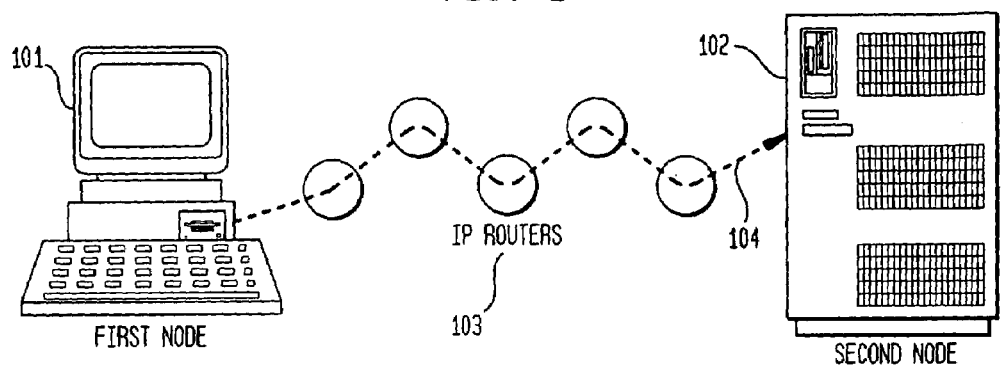
FIG. 1 is a diagram of two nodes communicating via routers.
Figure 2:
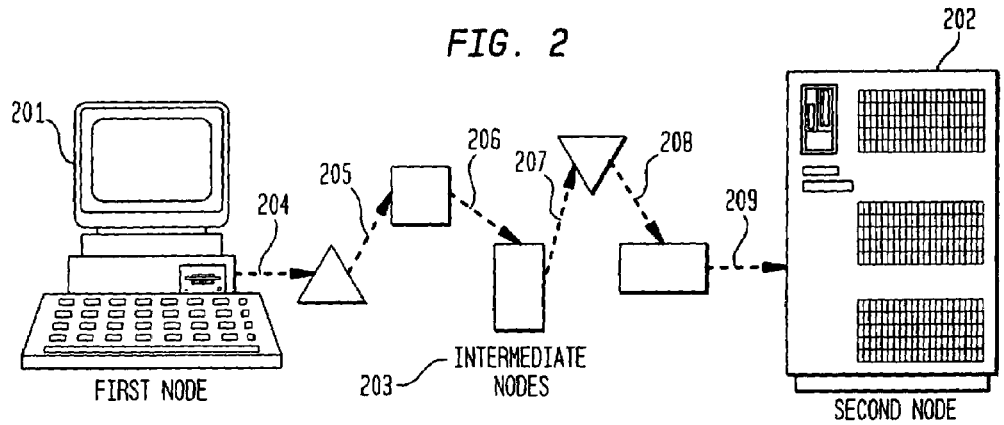
FIG. 2 is a diagram of two nodes communicating via intermediate nodes.
Figure 3:
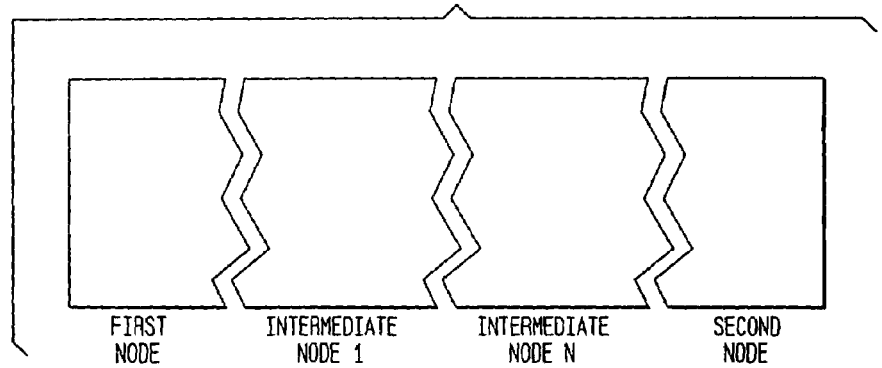
FIG. 3 is a conceptual diagram that depicts interfaces exported and bound to by intermediate nodes.
Figure 4:
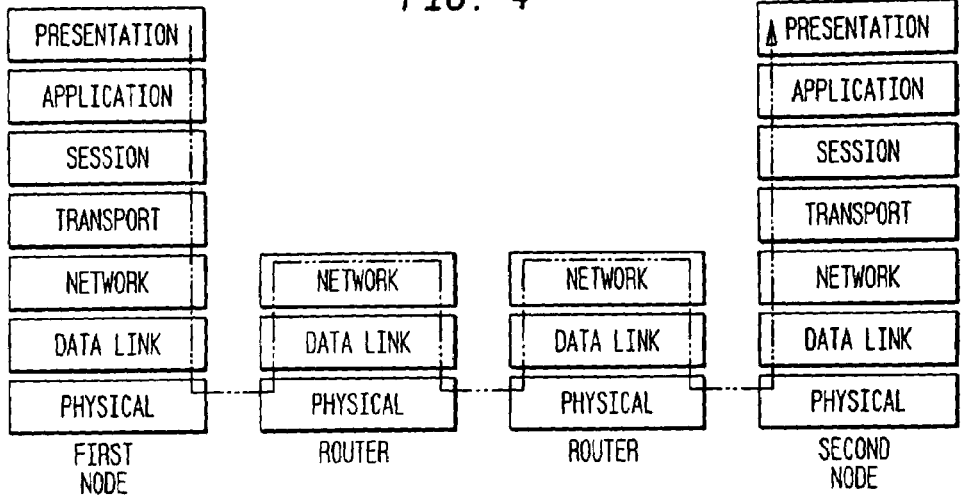
FIG. 4 is a diagram that depicts layer processing performed by routers.
Figure 5:
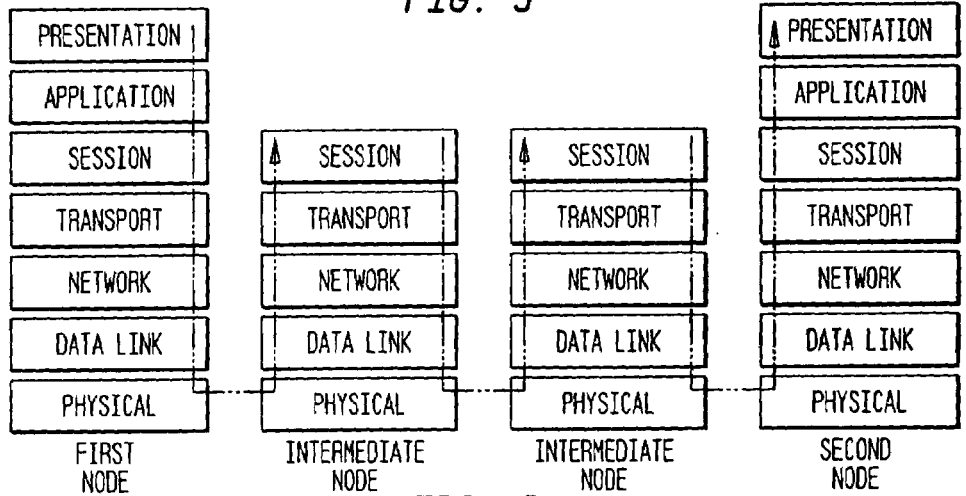
FIG. 5 is a diagram that depicts layer processing performed by intermediate nodes.
Figure 6:
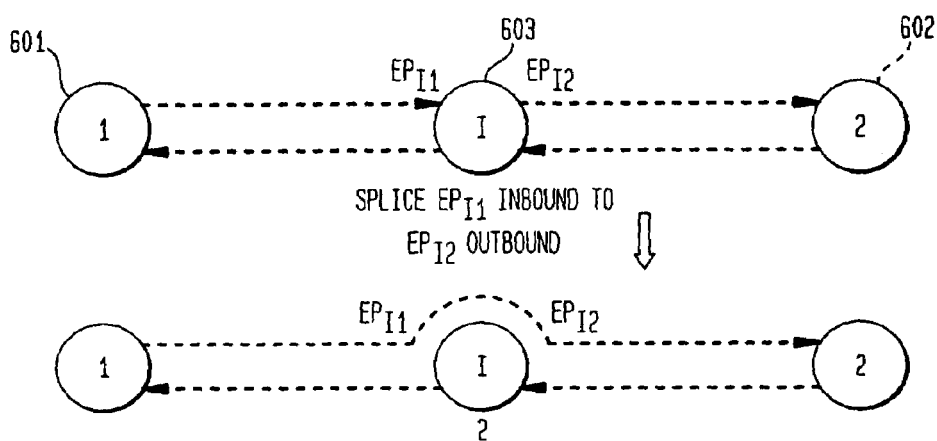
FIG. 6 is a diagram that depicts flow transformation resulting from a flow splice in accordance with the present invention.
Figure 7:
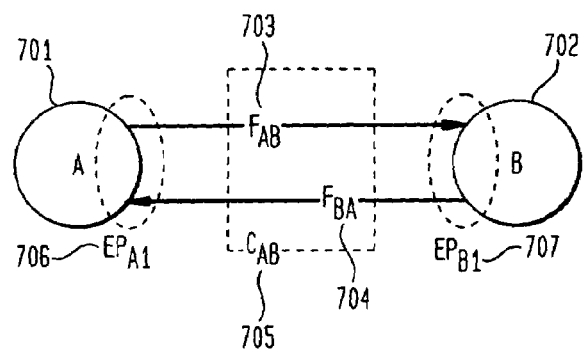
FIG. 7 is a schematic diagram of two nodes communicating via a connection.

A node is any device capable of communicating via one or more communication networks or links. FIG. 7 depicts two nodes A 701 and B 702 communicating via a connection $C_{AB}$ 705. The connection $C_{AB}$ 705 is bi-directional and includes of two flows. Flow $F_{AB}$ 703 carries data from node A 701 to node B 702. Similarly, data flows in the reverse direction, that is from node B 702 to node A 701 along flow $F_{BA}$ 704. A connection therefore includes of two flows, one in each direction, between a pair of nodes.

A connection may also be denoted by a pair of end point pairs. In FIG. 7, connection $C_{AB}$ 705 extends between end point pair $EP_{A1}$ 706 at node A 701 and end point pair $EP_{B1}$ 707 at node B 702. End point $EP_{A1}$ 706 denotes the flow outbound from node A 701 via $F_{AB}$ 703 and the inbound flow to node A 701 via $F_{BA}$ 704. Similarly, end point pair $EP_{B1}$ 707 denotes the flow inbound to node B 702 via $F_{AB}$ 703 and the flow outbound from node B 702 via $F_{BA}$ 704. The order in which the nodes linked by a connection are listed in the connection name is not significant. For example the name $C_{BA}$ denotes exactly the same connection as $C_{AB}$ 705.

The nature of a flow is that data written to the source flow end point can subsequently be read from the destination flow end point. Although boths ends of a flow can reside on the same node, flows are commonly extended between nodes through the use of transport protocols such as TCP/IP, AppleTalk and NETBIOS.

One aspect of the present invention allows two flows, one inbound the other outbound relative to a given node, both flows being terminated at the given node, to be transformed into a single flow through the given node. The method of the present invention transforms the two flows into one flow which originates at the source of the original inbound flow and terminates at the destination of the original outbound flow. The method does not require any particular relationship between the two flows to be transformed other than that one flow be inbound the other flow be outbound at the intermediate node at which the transformation is performed. The two flows may or may not be associated with the same connection. The source of the inbound flow and destination of the outbound flow may reside on the same node or on different nodes. The term "flow splice" or simply "splice" is used herein to refer to this described transformation. Before two flows are spliced, any amount of data can be read from the inbound flow and written to the outbound flow. Subsequent to the creation of a splice, data arriving on the inbound flow is automatically sent on the outbound flow. That is, data is propagated to the outbound flow without any further action by the entity that invoked the splice operation. Except for performance considerations, a pair of spliced flows resembles a pair of flows where data is read from the inbound flow as it arrives and is immediately written to the outbound flow.

The splice operation has a wide variety of applications. For example the connections depicted in FIG. 8 could correspond to any of many different transport protocols including IP, UDP, TCP, IPX, OSI, NETBIOS, AppleTalk, etc. Any of several application programming interfaces (APIs) could be used to create and manipulate the flows transformed by a splice. These include the Berkeley Socket Interface, the STREAMS interface, NETBEUI and IBM's Common Programming Interface for Communication (CPI-C). Both flows transformed by a given splice may be associated with the same transport protocol or each may be associated with a different protocol. Each protocol may be either connection oriented or connection less. We proceed to describe the method of the present invention in its most general form and subsequently describe specific instances of the invention's application in more detail.

The specific details of implementing the splice operation vary somewhat depending on the particular transport protocols involved. One characteristic feature of a splice implementations is however that it "short circuits" or reduces protocol processing at and above the transport layer. An obvious approach to reducing processing above the transport layer is for the splice implementation to simply modify each packet received on the inbound flow to make it suitable for transmission on the outbound flow and immediately send the packet.

Another aspect of the present invention defines an architecture for manipulating data flows that can be combined with an existing communication architecture. The only requirement of the existing architecture is that is allows the establishment of data flows.

Figure 8:
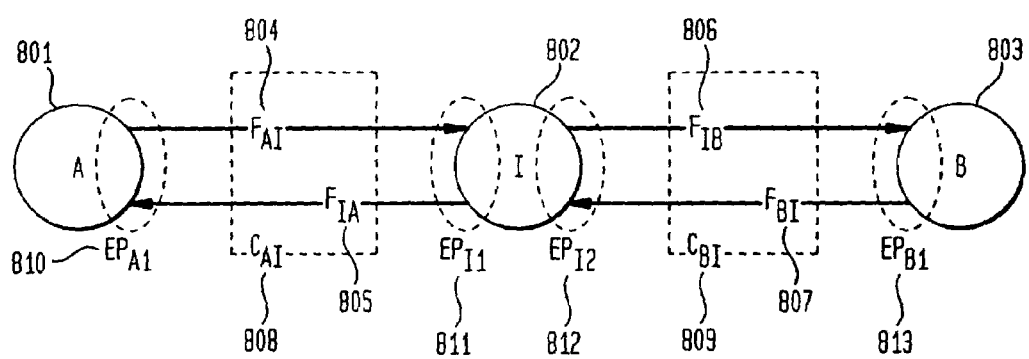
FIG. 8 is a schematic diagram of two nodes each of which has established a connection with an intermediate node.

FIG. 8 depicts a scenario that includes three nodes A 801, I 802, and B 803 and two connections $C_{AI}$ 808 and $C_{BI}$ 809. Node I 802 represents an intermediate node between nodes A 801 and B 803. An intermediate node is a node that influences communication between one or more pairs of nodes that communicate with each another by connecting to the intermediate node. There are many different ways in which an intermediate node can influence communication between node pairs. For example, an intermediate node might simply enable communication between two sets of nodes that would not otherwise be able to communicate. An intermediate node might enforce security restrictions by allowing each node to communicate with only a specifically authorized set of nodes. An intermediate node might also improve the performance of communication between two sets of nodes by caching, that is retaining a copy of, data transferred between the sets of nodes and providing such data to a node when it is requested eliminating the need for the data to be resent by the node from which it was originally obtained.

Figure 9:
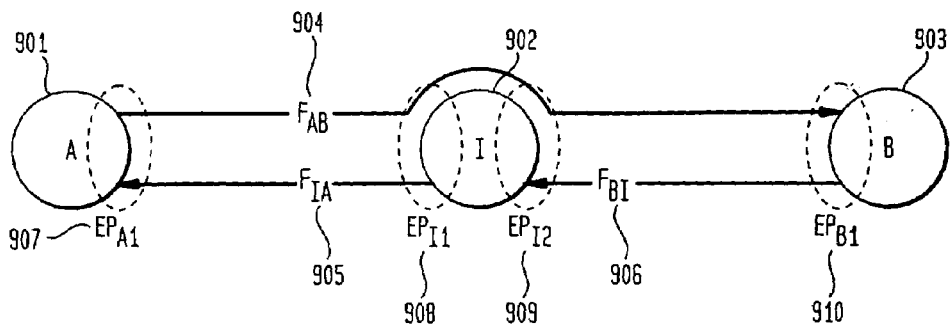
FIG. 9 is a schematic diagram that depicts the effect of using a flow splice to transform two flows into a single flow in accordance with the present invention.

FIG. 9 shows the scenario that results from transforming the scenario in FIG. 8 using a flow splice. Specifically, FIG. 9 shows the results of transforming FIG. 8 by splicing flow $F_{AI}$ 804 to flow $F_{IB}$ 806 at node 1802. The splice transforms the two flows, $F_{AI}$ 804 and $F_{IB}$ 806, into a single flow $F_{AB}$ 904. This splice operation can be described in terms of end point pairs at node I 802. Specifically, FIG. 9 depicts the inbound flow associated with end point pair $EP_{I1}$ 811 having been spliced to the outbound flow associated with end point pair $EP_{I2}$ 812. A splice operation is therefore performed on a pair of flows. One flow is inbound and the other flow is outbound relative to the intermediate node at which the splice is performed.

By combining two flows into one, the splice eliminates two flow end points. The two are the destination end point of the inbound flow, and the source end point of the outbound flow. Note two of the so-called end point pairs in FIG. 9, specifically $EP_{I1}$ 908 and $EP_{I2}$ 909 include only a single end point. Also note FIG. 9 does not show any connections as previously defined. That is it does not show any flow pairs in opposite directions between the same pair of nodes. The splice depicted in FIG. 9 therefore eliminates the connections $C_{AI}$ 808 and $C_{BI}$ 809 shown in FIG. 8.

The splice depicted in FIG. 9 changes the destination of the outbound flow associated with end point pair $EP_{A1}$ 810 on node A 801 and similarly changes the source of the inbound flow associated with end point pair $EP_{B1}$ 813 on node B 803. Despite this, the splice is transparent to both node A 901 and node B 903. Nothing intrinsic to the splice allows an observer on node A 901 to detect that data sent outbound from end point pair $EP_{A1}$ 907 ends up at node B 903 instead of node I 902. Similarly, nothing intrinsic to the splice allows an observer on node B to detect that data received on end point pair $EP_{B1}$ 910 originates at node A 901 instead of node I 902.

The splice is, in fact, undetectable from node B 903 unless either the data received on the inbound flow associated with end point pair $EP_{B1}$ 910 or the rate at which it arrives identifies the sender. Similarly the splice can not be detected from node A 901 unless the rate at which data is received after being sent on the outbound flow associated with end point pair $EP_{A1}$ 907 can be detected at node A 901 in such a way as to identify the receiver.

Figure 10:
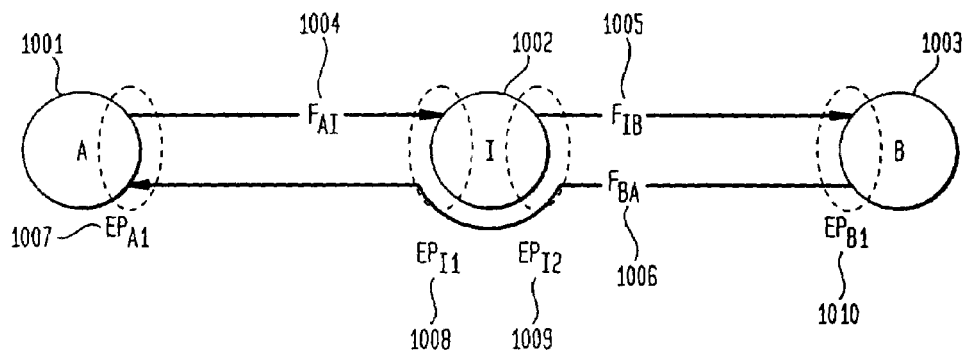
FIG. 10 is a schematic diagram that depicts the effect of using a flow splice to transform two flows into a single flow in accordance with the present invention.

FIG. 10 also depicts a scenario that results from transforming the scenario in FIG. 8 with a flow splice. FIG. 10 shows the result of splicing the inbound flow associated with end point pair $EP_{I2}$ 812 with the outbound flow of end point pair $EP_{I1}$ 811. Splicing these two flows results in a single flow $F_{BA}$ 1006 shown in FIG. 10. FIGS. 9 and 10 together show that the flows in either direction between a pair of nodes communicating via an intermediate node can be transformed into a single flow via a splice.

Figure 11:
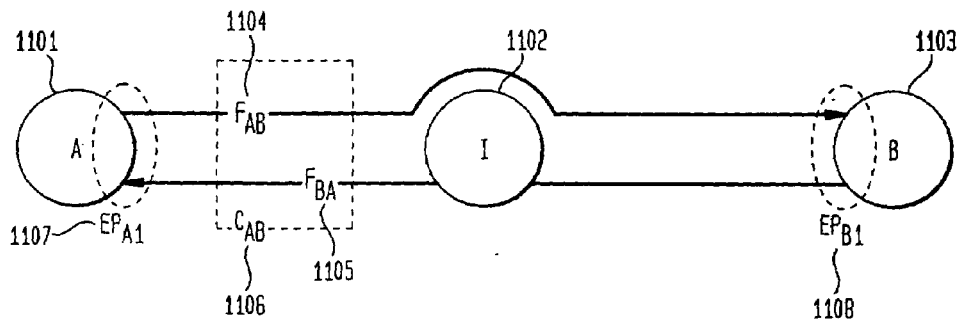
FIG. 11 is a schematic diagram that depicts the effect of using a pair of flow splices to transform two connections into a single connection.

FIG. 11 shows the scenario that results from transforming the scenario in FIG. 8 with two splices, those depicted in FIG. 9 and FIG. 10. One splice transforms flows $F_{AI}$ 804 and $F_{IB}$ 806 into flow $F_{AB}$ 1104. The other splice transforms flows $F_{BI}$ 807 and $F_{IA}$ 805 into flow $F_{BA}$ 1105. Unlike the scenarios depicted in FIG. 9 and FIG. 10, the scenario in FIG. 11 includes a connection. The two splices transform connections $C_{AI}$ 808 and $C_{BI}$ 809 into connection $C_{AB}$ 1106. Thus just as a flow splice transforms two flows into one, a pair of flow splices can transform two connections into one.

Figure 12:
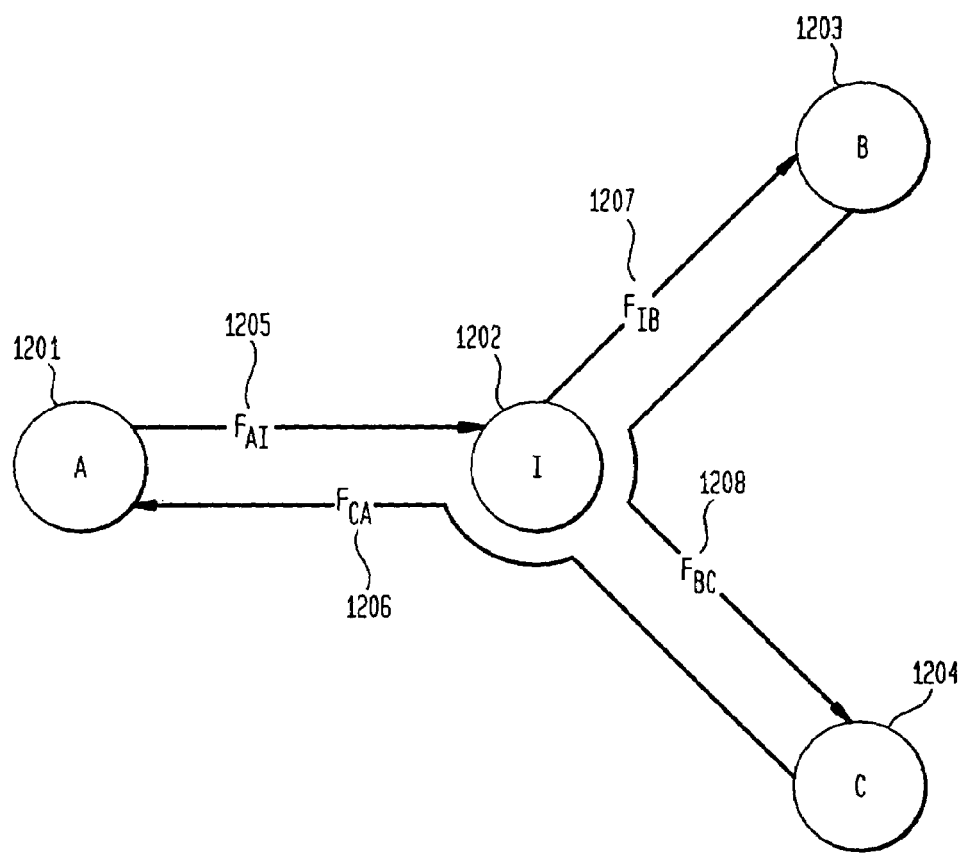
FIG. 12 is a schematic diagram that depicts the effect of applying two splices to transform six flows into four in a scenario in with three nodes have each established a connection with a fourth node in accordance with the present invention.

More complicated examples of flow splicing are possible. FIG. 12 shows an example with four nodes, A 1201, I 1202, B 1203, and C 1204 and four flows $F_{AI}$ 1205, $F_{CA}$ 1206, $F_{IB}$ 1207 and $F_{BC}$ 1208. The scenario in FIG. 12 resulted from transforming a scenario with three connections, one from node I 1202 to each of nodes A 1201, B 1203, and C 1204 with two flow splices. Another likely scenario is the case where a series of flows from a source node to a destination through a set of network intermediaries are transformed into a single flow from the source to destination using a number of flow splices.

We now consider the use of flow splicing. The splice architecture allows a flow to be spliced after any amount of data, or no data, has been sent or received on the flow. The architecture also allows a spliced flow to revert to the unspliced state either due to termination of the inbound flow or because the splice was explicitly eliminated at the intermediate node. This flexibility allows flow splicing to be used in a variety of ways.

One potential use for flow splicing is load balancing. An intermediate node can use flow splicing to balance the load from a set of clients across a set of servers. An intermediate node can implement load balancing by establishing one or more flows with client nodes, establishing one or more flows with server nodes and splicing flows between the clients and servers.

Another use for flow splicing is content partitioning. This refers to dividing a set of content (or services) across a set of servers possibly with multiple servers providing the same content. An intermediate node can make it appear to clients that all the content is available from a single server node. A content partitioning intermediate node operates similarly to a load balancing intermediate node in terms of splicing flows between clients and servers.

As an example we consider an intermediate node that allows World Wide Web content to be partitioned across a set of servers. The web intermediate node starts by accepting a TCP connection from a client. It then reads one or more requests from the flow inbound from the client. Next the intermediate node determines an appropriate server to service the client request(s). It then establishes a connection, including of two flows one in either direction, with the selected server assuming an appropriate connection is not already available. The intermediate node then selects the inbound flow from the chosen server and the outbound flow to the client and splices the selected flows. Finally, the intermediate node writes the request that it had received from the client to the server.

The response from the server subsequently flows to the client via the splice. The client may close the connection after sending a request in which case processing for the connection is complete. The client might also send another request on the same connection in which case the intermediate node can either write the request to the same server allowing the response to flow across the established splice or resplice the outbound flow to the client to a different flow inbound from a server and send the client request on the corresponding flow outbound to that server instead.

It will be understood by those skilled in the art that the process just described can be applied to a wide variety of intermediate node functions and communication protocols. For example, the steps listed above for the web intermediate node can be used to provide load balancing and content partitioning for a list of protocols including HTTP, SOCKS, telnet, FTP, AFS, DFS, NFS, RFS, SMTP, POP, DNS, Sun RPC, and NNTP.

One significant aspect of many applications of flow splicing is that the intermediate node may decide what node to establish either the first or second connection with based on several factors. For example the intermediate node may determine what node to establish the second connection with after parsing a request read from the first connection. The intermediate node might also determine what specific port or address within the first node to establish the first connection with based on the remote address associated with the second connection. The intermediate node might do this to direct requests from certain clients to certain servers. Other factors the intermediate node may consider include estimates of bandwidth and latency for the various flows, quality of service (QoS) requirements for the various flows, the number of network hops between any of the nodes, and configuration or state information stored at the intermediate node.

In addition to determining what address a connection should be established with, the intermediate node may determine whether to perform a splice at all based on several factors. For example an intermediate node may parse requests sent by a client to a server in order to estimate the amount of data expected to flow from the server to the client and splice only flows expected to handle a lot of data. The intermediate node might also splice only flows expected to support high bandwidth and/or low latency. Finally the intermediate node might splice only those flows associated with a specific set of clients or servers.

We now describe a method that embodies the splice operation for the specific case where both flows joined by the splice are associated with TCP connections. It will be understood by those skilled in the art that the concept of transforming two flows, one inbound the other outbound at a given point, into a single flow from the source of the original inbound flow to the destination of the original outbound flow by suitably modifying packet headers can be applied to any packet based communication protocol.

Let us now consider TCP state. Every TCP end point pair has a set of associated state information. This information is referred to in the following discussion by the name TCB which stands for TCP Control Block. The specific way in which the state information is stored in a TCB is not important to the following discussion. The discussion does however refer to some specific elements of the TCB which are described as follows.

snd_nxt—The sequence number of the next byte to be sent. One greater than the greatest sequence number sent so far.

snd_una—The smallest sequence number associated with any byte that has been sent, but has not yet been acknowledged. Equal to the greatest acknowledgment value received.

rcv_nxt—The sequence number of the next byte of data expected to arrive. One more than the greatest sequence number received.

rcv_wnd—An offset from rcv_nxt that identifies the largest sequence number a receiver is willing to receive.

Figure 13:
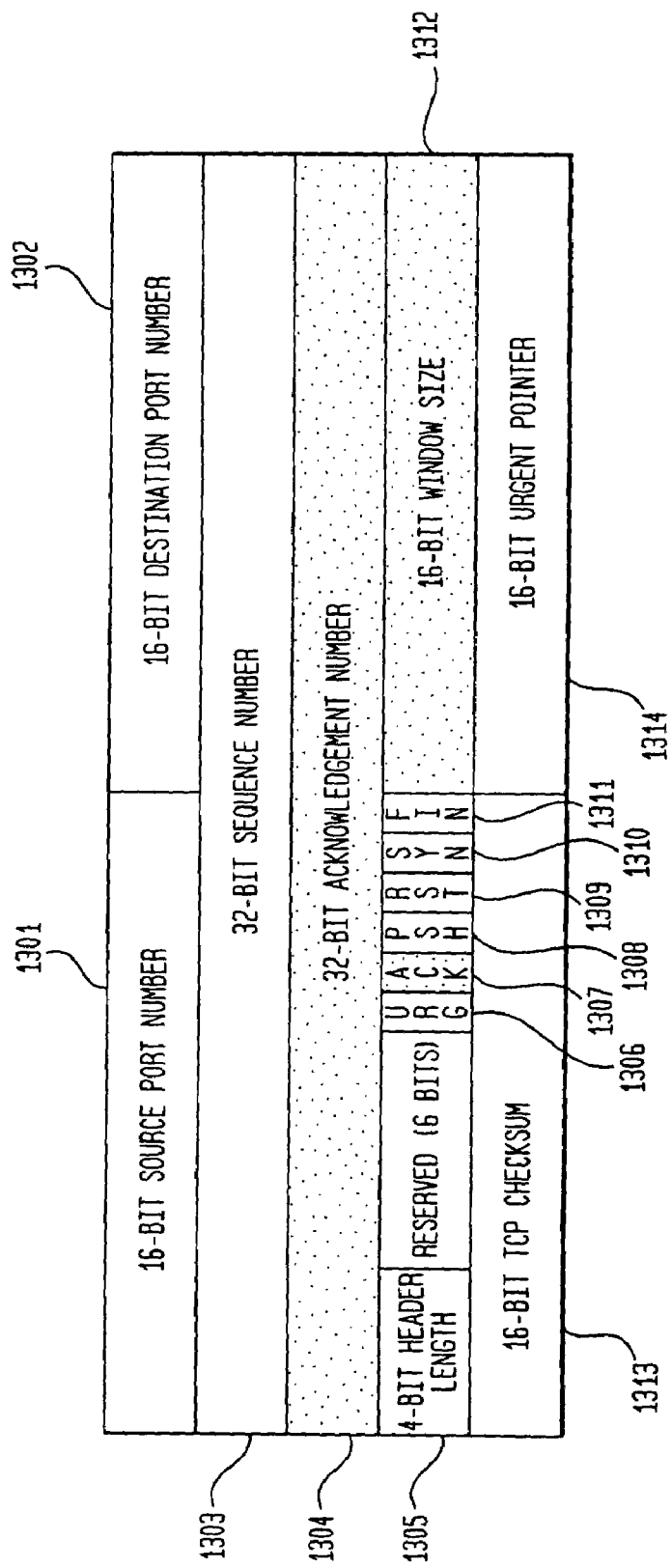
FIG. 13 is a diagram of TCP header format.

Now we consider forward and reverse information. FIG. 13 shows the structure of a TCP packet header. The information contained in a TCP packet may be divided into two categories. The first we call forward outbound information. This includes of the packet's data payload and associated sequence number 1303, checksum 1313, urgent pointer 1314, and any time stamp option value. The second category we call reverse inbound information. This includes the acknowledgment flag 1307 and field 1304, window size 1312, and any time stamp option echo value. The fields of the TCP header that contain reverse inbound information are shaded in FIG. 13.

Certain fields of the TCP header and in the associated IP header identify the connection with which the segment is associated. These fields are the source and destination port number in the TCP header and the source and destination IP address in the IP header. Because these fields identify the connection, they are associated with both the forward outbound and reverse inbound information.

The forward information is intended for the end point pair to which data is sent on a TCP connection. The reverse information is intended for the end point pair from which data is received on the connection. Without flow splicing, these two end point pairs are identical. A splice, however, can break this equality. The ability to splice each flow associated with an end point pair independently relies on independent processing of the forward outbound and reverse inbound information. The specific details of processing forward and reverse information in TCP packets is described in further detail below.

Figure 14:
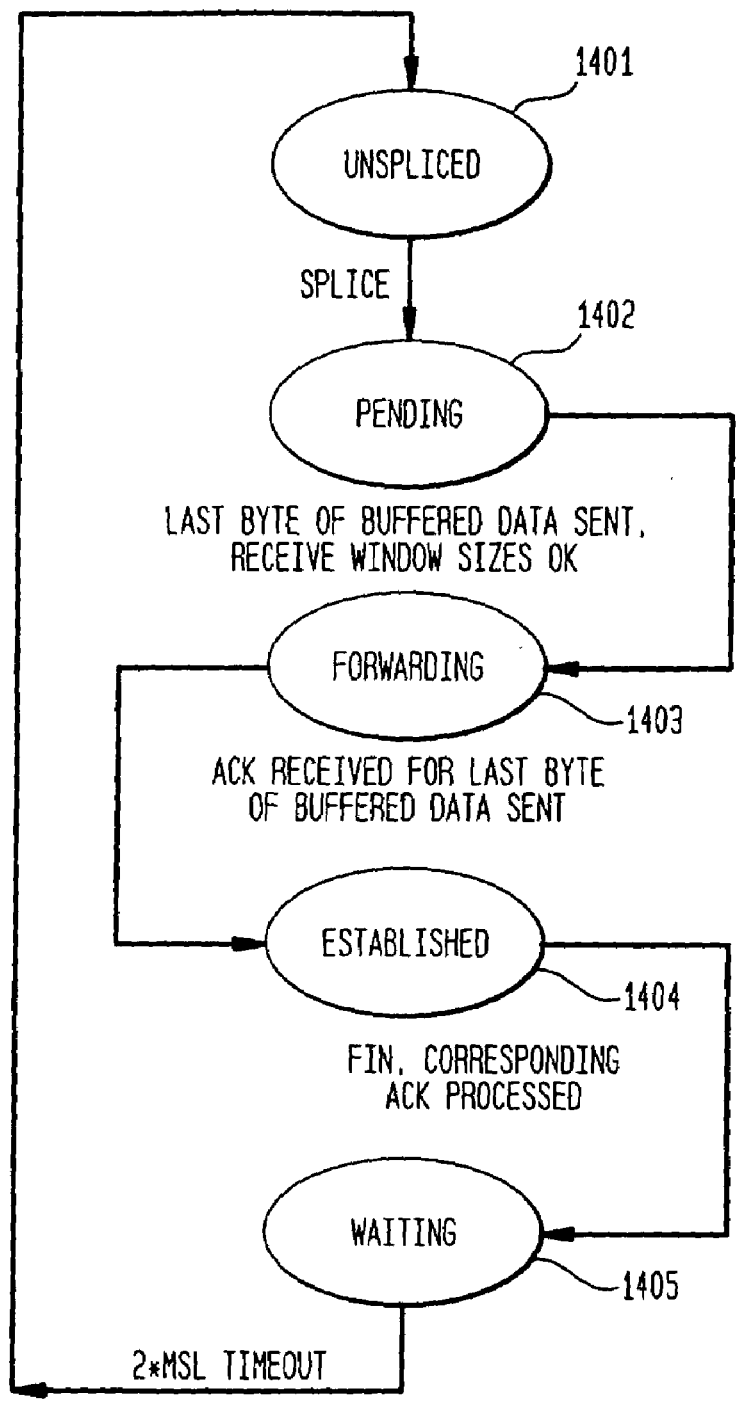
FIG. 14 is a state diagram that shows various states for a TCP to TCP splice and the logic that governs state transitions in accordance with the present invention.

The next aspect to consider is splice states. A flow splice joins two flows into one thus eliminating a pair of flow end points. Several factors may make it impossible for the end points to be eliminated immediately when a splice is created. A splice therefore has an associated state value that influences its operation. We now discuss various factors that influence a splice's state and the operation of a splice in each state. A state diagram showing the various splice states and the logic for transitions between them is shown in FIG. 14.

One consideration that can prevent spliced end points from being eliminated is the presence of data in send or receive buffers associated with the spliced flows. Each flow end point generally has an associated buffer. An inbound flow has a receive buffer that contains data that has been received but has not yet been read by the application. An outbound flow has a send buffer that contains data that has been written by the application but has not yet been successfully sent. Any data that resides in the send buffer when the splice is created is sent before packets can be forwarded via the splice. Similarly any data in the receive buffer is sent after any data in the send buffer and before any packets are forwarded.

If data resides in either the send or receive buffer when a splice is created, the splice starts in the PENDING 1402 state. Any data residing in the receive buffer when the splice is created is appended to the contents, if any, of the send buffer. The receive buffer is then essentially eliminated as any data subsequently arriving at a splice in the PENDING 1402 state is appended to the send buffer associated with the outbound flow instead of being appended to the receive buffer of the inbound flow as would be the case for data arriving on an unspliced flow.

Full protocol processing is performed for each end point associated with a splice in the PENDING 1402 state. A PENDING 1402 splice behaves similarly to a program that reads data from the inbound flow as it arrives and writes it to the outbound flow. The splice however eliminates the need to invoke a separate program, possibly saving protection domain and context switches, and also eliminates any data copies between the protocol implementation and the program.

A splice remains in the PENDING 1402 state at least until its send buffer is empty. Additional data arriving at a PENDING 1402 splice may thwart attempts to empty the buffer. A PENDING 1402 splice may therefore limit the amount of data it receives by closing its receive window. The receive window is an item of reverse inbound information that informs a sender how much data a receiver is willing to receive. The TCP protocol forbids a receiver from decreasing its receive window by an amount greater than the amount of data it has received. In other words, once a receiver has indicated it is able to receive a given amount of data, it honors its commitment. However, if a receiver indicated it is capable of receiving X bytes of data and subsequently receives Y bytes it is permitted to decrease its receive window to X-Y.

A PENDING TCP flow splice could also limit the amount of data it receives by withholding acknowledgments for data that it receives. The lack of acknowledgments will discourage the sender from sending additional data. Withholding acknowledgments may also cause the sender to retransmit data that has already been sent. For this reason it may be advantageous for a PENDING splice to limit the amount of data it receives by decreasing the send window rather than by withholding acknowledgments.

Regardless of the presence of buffered data, a splice is also prevented from proceeding beyond the PENDING 1402 state if the receive window advertised to the splice source (by the splice) is greater than the receive window advertised by the splice destination (to the splice). If this situation arises, the splice remains PENDING 1402 until it has received enough data to allow it to eliminate the gap between the receive window sizes.

Once the last byte of buffered data if any has been sent and the receive window has been decreased to the value advertised by the receiver if need be, the splice enters the FORWARDING 1403 state. In this state packets arriving at the splice are modified and forwarded. However, reverse inbound information associated with buffered data, as opposed to data simply forwarded through the splice, is handled in the same way as for an unspliced flow, rather than being forwarded to the sender. Once the splice is in the FORWARDING 1403 state, full protocol processing need not be performed for the inbound flow. Processing of reverse inbound information, including performing retransmission still occurs, however, for the outbound flow.

Eventually the last reverse inbound information that refers to buffered data should be received at which point the splice enters the ESTABLISHED 1404 state. In this state both forward and reverse inbound information is processed (modified) and forwarded.

We now consider flow termination. When a node communicating via a splice terminates its flow, the termination can be handled by the splice in either of two ways. In one embodiment the splice propagates the termination, or FIN in TCP parlance just as it propagates ordinary data. This causes both flows joined by the splice to be shut down. In another embodiment the splice itself processes the FIN. This results in only the inbound flow at the splice being shut down and causes the outbound flow to revert to the UNSPLICED 1401 state. Having the splice propagate the FIN is desirable in situations where an intermediate node does not need to send any more data on the outbound flow after creating a splice. Having the splice process the FIN allows an intermediate node to either send additional data on the outbound flow, or resplice the flow.

Once a splice has processed a FIN and a corresponding ACK, it enters the WAITING 1405 state. This state is identical to the ESTABLISHED 1404 state except for the presence of a timer that causes the splice to cease to exist when it expires. The timer is set to 2*MSL, twice the maximum segment lifetime, when the splice enters the WAITING 1405 state and reset to 2*MSL whenever a packet is forwarded through the splice. Usually no packets are forwarded through the splice once it enters the WAITING 1405 state and the splice is eliminated 2*MSL after the FIN and corresponding ACK are processed. The purpose of the WAITING state is to account for any retransmitted packets.

The 2*MSL time-out is conservative in that the splice persists only until it can be determined that any retransmissions that might occur would have been seen at the splice. However, the retransmission time-out value used by a TCP sender is a function of both the estimated round trip time and its variance and it is difficult for the splice to accurately estimate these values as viewed by the sender.

Now consideration is given to sequence and acknowledgment number mapping. TCP is a stream oriented protocol. Although a sending client presents data to the protocol in discrete buffers and the protocol partitions transmitted data into packets, neither buffer nor packet boundaries are visible to the receiver. TCP presents data to a receiver as a continuous stream bounded only by a single pair of beginning and end points. To ensure data is presented to the receiver in exactly the same order in which it was sent, TCP assigns a 32-bit sequence number to each byte in the stream. The initial sequence number, that is the sequence number for the first byte to traverse a flow, is generally selected in a way that makes it difficult to predict and the sequence number is incremented by one for each successive byte.

Because different flows generally have different initial sequence numbers and because any amount of data can be sent on a flow before it is spliced, the sequence numbers for data flowing through a splice are mapped from the inbound to the outbound flow. For example, consider two flows shown in FIG. 8, $F_{AI}$ 804 which extends from node A 801 to node I 802, and $F_{IB}$ 806 that extend from the node I 802 to node B 803. Assume the initial sequence number for $F_{AI}$ 804 (chosen by node A 801) is 1,000, and the initial sequence number for $F_{IB}$ 806 (chosen by the node I 802) is 10,000. Further assume 200 bytes has arrived at I 802 on $F_{AI}$ 804 and 300 bytes have been sent from I 802 on $F_{IB}$ 806 before $F_{AI}$ 804 is spliced to $F_{IB}$ 806. When the splice is created, the sequence number of the next byte to be received on $F_{AI}$ 804 is 1,200 and the sequence number of the next byte to be sent on $F_{IB}$ 806 is 10,300. Thus as data flows through the established splice the sequence number in each TCP packet is mapped from the inbound flow, $F_{AI}$ 804, to the outbound flow $F_{IB}$ 806 by adding 9,100 (10,300−1,200). Acknowledgment numbers flowing in the opposite direction are mapped by subtracting 9,100.

Creating a splice between two sequence-oriented flows establishes a correspondence between the sequence space of the first flow and the sequence space of the second flow. In the case of a splice between two TCP flows, the correspondence amounts to a fixed offset between the sequence number of a byte arriving at the intermediate node on the inbound flow and the sequence number of the corresponding byte sent by the intermediate node on the outbound flow.

The correspondence established when a splice is created can be calculated in a number of ways. For example, if when a splice is created, no data resides in either send or receive buffers associated with the flows to be spliced at the intermediate node, the offset can be calculated by subtracting the sequence number of the next byte expected from the source (rcv_nxt) from the sequence number of the next byte to be sent to the destination (snd_nxt). If either the receive buffer associated with the inbound flow or the send buffer associated with the outbound flow contains data, the sequence number of the next byte to be sent on the outbound flow is adjusted to account for the buffered data that will be sent before any data is forwarded through the splice. Alternately, the calculation of the offset can be delayed until both the send and receive buffer are empty.

We refer to the inbound and outbound flows at the splice even though the splice transforms the two flows into one. Strictly speaking, we are referring to the sequence number space associated with the former flow from the splice source to the intermediate node and the sequence number space associated with the former flow from the intermediate node to the splice destination. For brevity we simply refer to the inbound and outbound flows.

Figure 15:
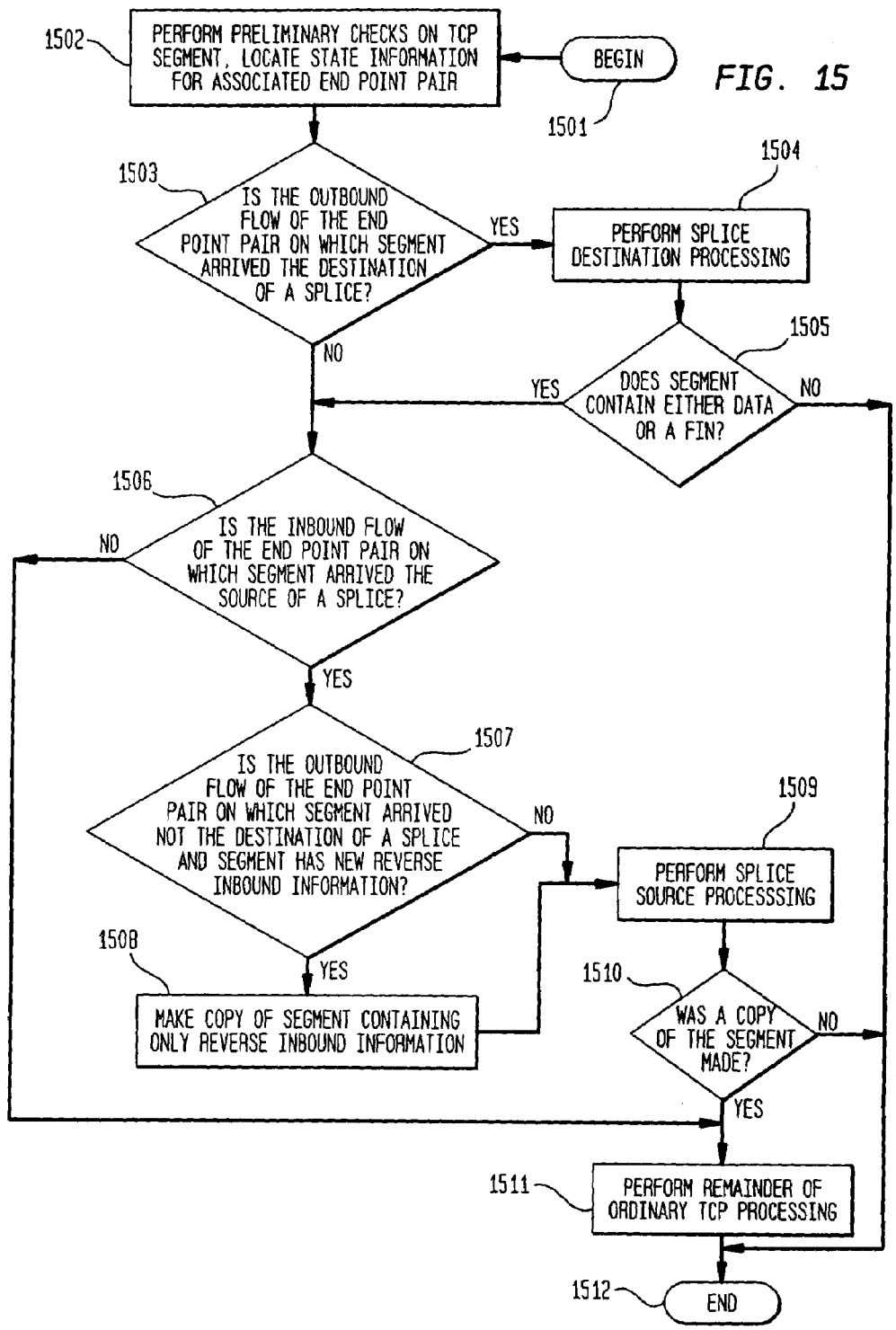
FIG. 15 is a flow diagram that provides an overview of the logic for processing TCP segments associated with a flow splice in accordance with the present invention.

Processing for a TCP to TCP Splice in the established state is now considered. FIG. 15 is a flow diagram that gives an overview of the logic for processing TCP segments associated with a flow splice in the ESTABLISHED 1404 state. The initial processing is the same regardless of whether or not the segment is associated with a splice. First, in block 1502, several preliminary checks are performed to make certain the packet contains a valid TCP segment. The state information for the end point pair with which the segment is associated is then located. If no such state information is found, the segment is discarded and processing for the segment is complete. If the outbound flow of the end point pair on which the segment arrived is the destination of a splice the reverse inbound information contained in the segment is subjected to splice destination processing. This processing is described in further detail below and is depicted in FIG. 16.

If a segment is subject to splice destination processing and contains neither data nor a FIN, then processing for the segment is complete. If a segment does contain either data or a FIN or the segment was not subject to splice destination processing the inbound flow of the end point pair on which the segment arrived is checked in decision block 1506 to see if it is a splice source. If the flow is not a splice source, the segment is subjected to the remainder of ordinary TCP input processing. If the inbound flow is a splice source, the corresponding outbound flow is checked in decision block 1507 to determine if it is not the destination of a splice and the segment is checked to see if it contains new reverse inbound information. If these two conditions are true, a copy of the reverse inbound information in the segment is made in block 1508 so it can be subjected to the remainder of the ordinary TCP input processing. A segment is considered to contain new reverse inbound information if it contains an acknowledgment number greater than the largest acknowledgment number previously seen on this flow, or if it contains a window update. The segment is next subjected to splice source processing which is described in further detail below and depicted in FIG. 17. If a copy of the segment's reverse inbound information was made, that information is subjected to the remainder of ordinary TCP input processing in block 1511. This 1512 completes processing for a TCP segment associated with a splice.

Figure 16:
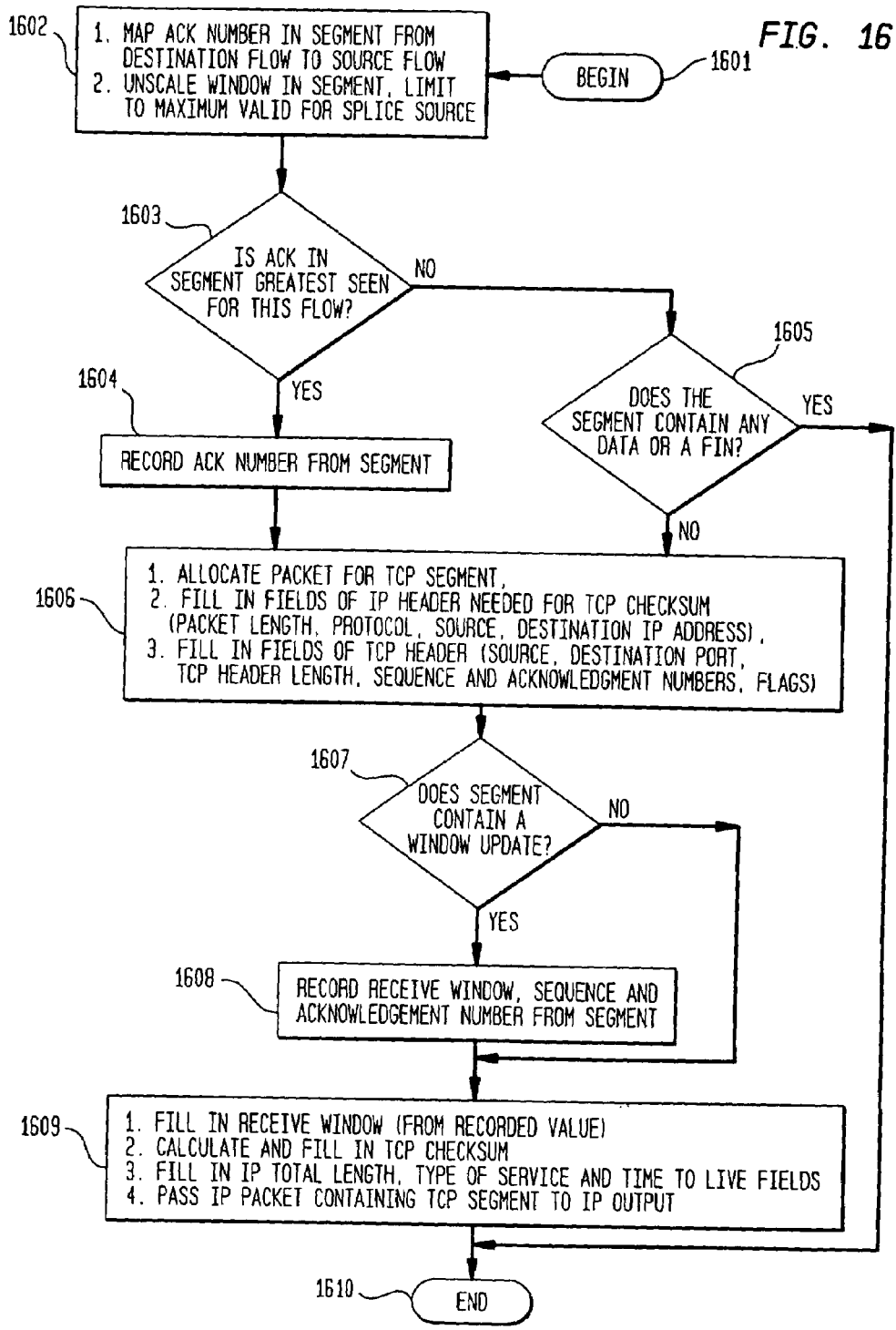
FIG. 16 is a flow diagram that describes splice destination processing in accordance with the present invention.

FIG. 16 is a flow diagram that depicts splice destination processing. Processing begins in block 1601 and in 1602 the acknowledgment number in the segment is mapped from the destination flow to the source flow, and the window value in the segment is unscaled and limited to the maximum value that can be communicated to the splice source. The limiting factor is required in cases where the node on which the splice is performed has negotiated a larger window scale value with the splice destination than with the splice source. The mapped acknowledgment number is then checked to determine if it is greater than the greatest acknowledgment number sent from the splice to the splice source (stored in the rcv_nxt field of the source TCB) 1603. If so the mapped acknowledgment number is recorded 1604 in the rcv_nxt field of the source TCB and processing continues with formulating a TCP segment containing reverse inbound information to be sent to the splice source in block 1606. Block 1606 includes:

1. Allocate packet for TCP segment,
2. Fill in fields of IP header needed for TCP checksum (packet length, protocol, source, destination IP address),
3. Fill in fields of TCP header (source, destination port, TCP header length, sequence and acknowledgment numbers, flags).

If the mapped acknowledgment value is not greater than the rcv_nxt field of the source TCB, the segment is checked to determine if it contains any data or a FIN 1605. If the segment contains either data or a FIN processing for the segment is complete. If not, processing continues with formulating a TCP segment containing reverse inbound information in block 1606.

Formulating the TCP segment begins with allocating a new packet and filling in the fields of the IP pseudo header needed for the IP checksum, specifically the packet length, protocol, and source and destination IP address. The IP addresses are copied from the source TCB. Next the fields of the TCP header are filled in. These are the source and destination port numbers, sequence and acknowledgment numbers, TCP header length and flags. The port numbers are copied from the source TCB. The only flag set is ACK. The sequence number is copied from the snd_nxt field of the source TCB. The acknowledgment field is set to the mapped acknowledgment value.

A determination is made to see if the segment contains a window update 1607. If it does, the value for the receive window, and sequence and acknowledgment numbers are recorded in the destination TCB 1608. Then block 1609 is performed and the receive window field of the TCP header is copied from the destination TCB. The TCP checksum is calculated and filled in. The total length, type of service and time to live fields of the IP header are filled in. Finally the packet is passed to the IP output routine and the process ends 1610.

In the embodiment described new reverse inbound information is propagated to the splice source immediately. The sending of reverse inbound information could also be delayed for a short period of time in the hope that it could be sent in segments containing forward data for the source instead of sending a packet containing only reverse inbound information.

Figure 17:
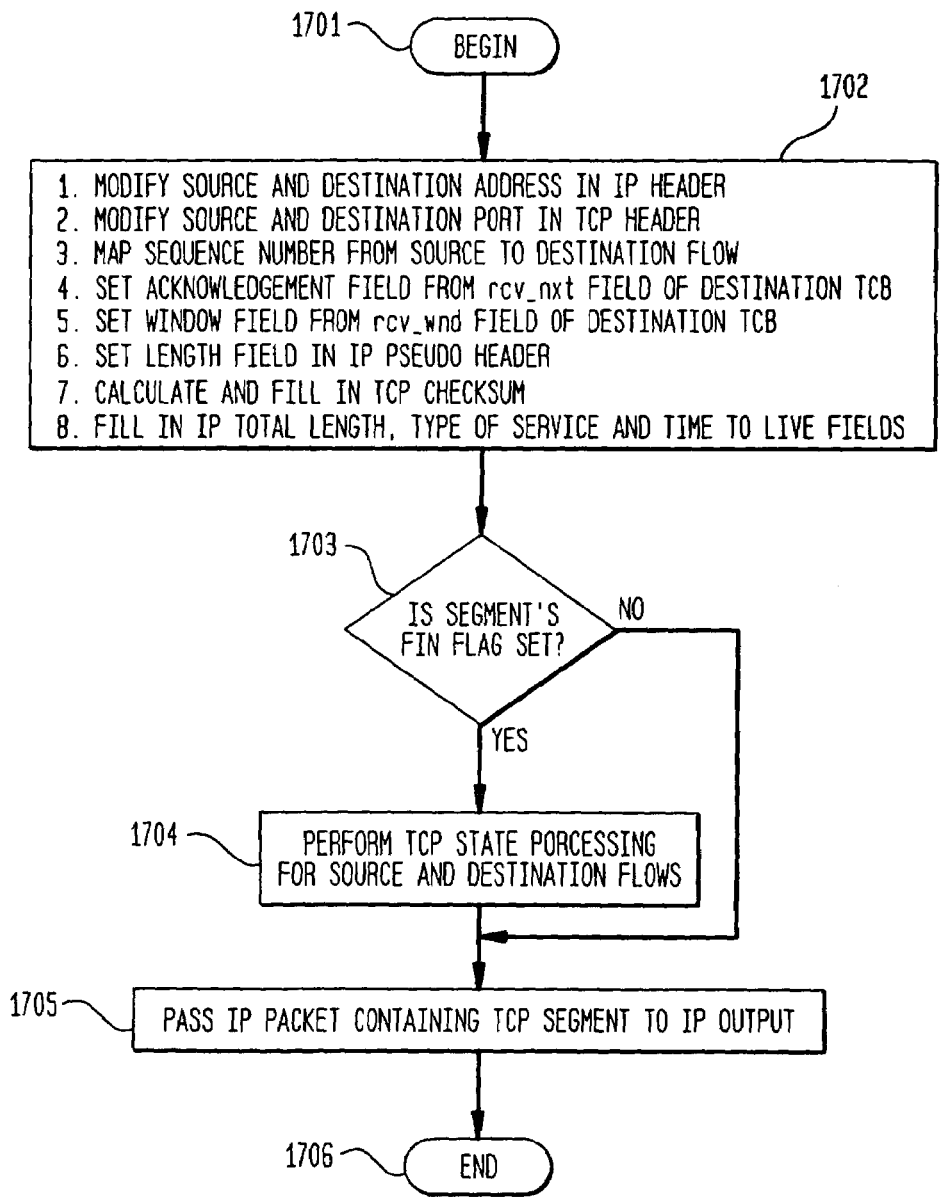
FIG. 17 is a flow diagram that describes splice source processing in accordance with the present invention.

FIG. 17 is a flow diagram that depicts the steps of an example of splice source processing. The majority of processing is performed in block 1702 and includes modifying information in the TCP and IP packet headers. Step 1702 includes:

1. Modify source and destination address in IP header
2. Modify source and destination port in TCP header
3. Map sequence number from source to destination flow
4. Set acknowledgment field from rcv_nxt field of destination TCB
5. Set window field from rcv_wnd field of destination TCB
6. Set length field in IP pseudo header
7. Calculate and fill in TCP checksum
8. Fill in IP total length, type of service and time to live fields The source and destination IP addresses and port numbers are modified by copying the appropriate values from the destination TCB. The sequence number is mapped from the source flow to the destination flow. The acknowledgment number and receive window fields are set by copying the values from the rcv_nxt and rcv_wnd fields of the destination TCB respectively. The length field in the IP pseudo header is set. The TCP checksum is calculated and filled in. The total length, type of service, and time to live fields of the IP header are filled in.

If the segment's FIN flag is set TCP state processing is performed for both the source and destination end point pairs. The processing for the source pair is the same as that performed when a FIN is received on an unspliced flow. The processing for the destination pair is the same as what takes place when a FIN is sent on an unspliced flow. Finally, the segment is passed to the IP output routine.

As described above, the preferred embodiment of TCP flow splicing recomputes the TCP checksum for each packet forwarded through a splice after the packet header as been modified. Techniques in common practice allow the new TCP checksum to be calculated by referring to only the original TCP checksum value and the changes made to the packet. This can improve performance compared to computing the checksum from scratch because it eliminates the need to reference all the data in the packet.

Preliminary checks are performed on the TCP segment in block 1502 of FIG. 15. These checks may or may not include TCP checksum calculation. Performing the checksum allows corrupt packets to be detected and eliminated as soon as possible which may save network bandwidth. Processing requirements are reduced, however, if the checksum calculation is eliminated from the splice. Elimination of the checksum is feasible as corrupt packets will still be detected by normal TCP processing at the destination node.

Figure 18:
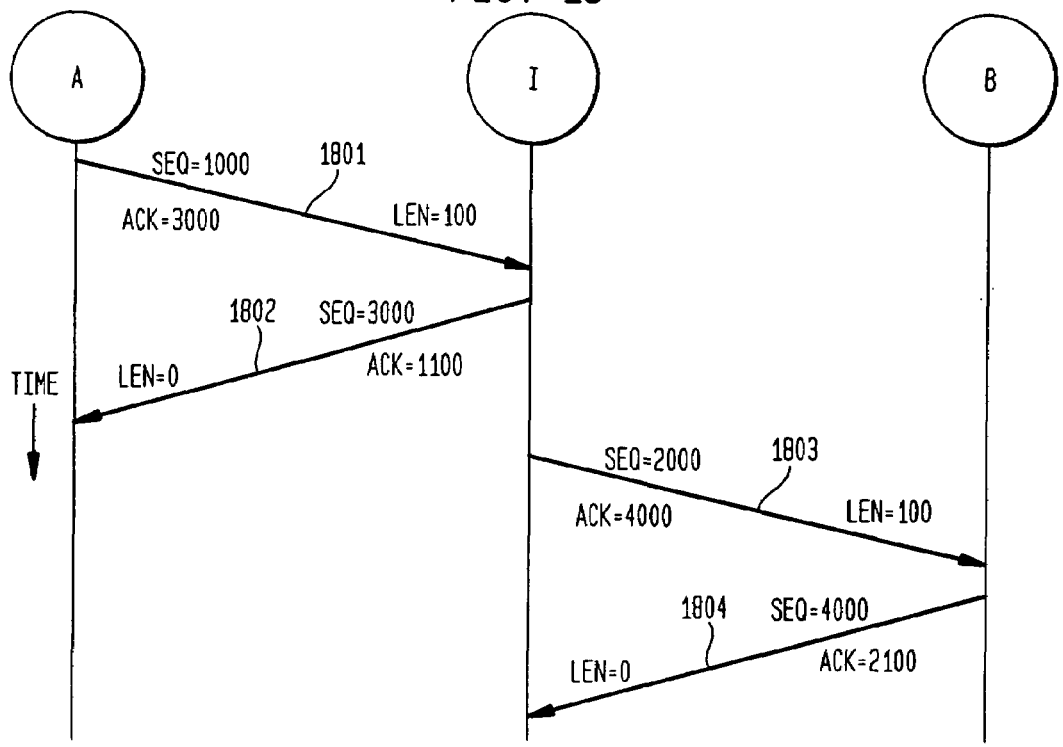
FIG. 18 is a graphical representation of a sequence of packets flowing through an intermediate node without flow splicing.

The flow splice may be defined in terms of packet sequences. FIG. 18 depicts an example of a sequence of packets associated with the scenario depicted in FIG. 8. In this scenario, each of two nodes A 801 and B 803 has established a connection with an intermediate node I 802. In addition to the elements explicitly depicted in FIG. 8, the scenario associated with FIG. 18 includes a program on node I 802 that continuously reads data from end point pair $EP_{I1}$ 811 and immediately writes any such data on end point pair $EP_{I2}$ 812. This corresponds to reading data from flow $F_{AI}$ 804 and writing it to flow $F_{IB}$ 806.

The packet flow depicted in FIG. 18 results from node A 801 sending 100 bytes of data on end point pair $EP_{A1}$ 810. These 100 bytes are contained in a single packet 1801. Subsequent to receiving this packet 1801, node I 802 sends an acknowledgment packet 1802 to node A 801. The acknowledgment packet 1802 indicates to node A 801 that the 100 bytes contained in the first packet 1801 have successfully arrived at the destination of the flow on which they were sent, that is the destination of flow $F_{AI}$ 804 which is node I 802.

Also subsequent to the arrival at node I 802 of packet 1801, node I 802 sends the 100 bytes of data received from node A 801 on end point pair $EP_{I2}$ 812. Again the data happens to be conveyed in a single packet 1803. Subsequent to the arrival at node B 803 of this packet 1803, node B 803 sends an acknowledgment packet 1804 to node I 802. This acknowledgment packet 1804 indicates to node I 802 that the 100 bytes contained in packet 1803 have successfully arrived at the destination of the flow on which they were sent, that is the destination of flow $F_{IB}$ 806 which is node B 803.

Although FIG. 18 depicts a specific strict temporal ordering of the transmission and reception of the four packets 1801, 1802, 1803 and 1804, certain other orderings are consistent with the depicted scenario. The only requirements on the temporal ordering are that each of packets 1802 and 1803 is sent from node 1802 after packet 1801 arrives at node I 802. Furthermore packet 1804 is sent from node B 803 after packet 1803 arrives at node B 803. Of course a packet can not arrive at its destination prior to being sent from its source.

The conclusive indication that the packet flow in FIG. 18 is associated with two flows that are not joined in a splice is that node 1802 sends to node A 801 an acknowledgment 1802 for the 100 bytes it received from node A 801 in packet 1801 before node I 802 receives from node B 803 an acknowledgment for the corresponding 100 bytes sent to node B 803 in packet 1803. This order indicates that the acknowledgment 1802 sent by node I 802 is generated by normal TCP processing and not a flow splice at node I 802.

Figure 19:
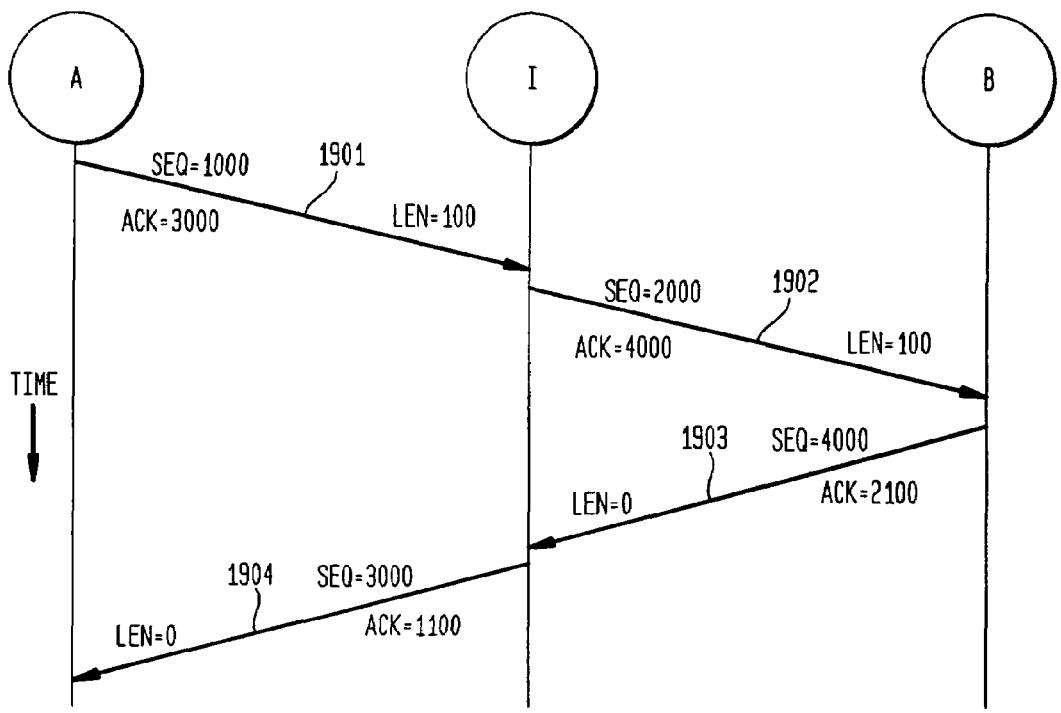
FIG. 19 is a graphical representation of a sequence of packets flowing through an intermediate node with a flow splice in accordance with the present invention.

FIG. 19 depicts a sequence of packets associated with the scenario depicted in FIG. 9. This scenario is identical to the scenario shown in FIG. 8 except that in FIG. 9 flow $F_{AI}$ 804 inbound to node I 802 has been spliced to flow $F_{IB}$ 806 outbound from node I 802 thus transforming the two flows into a single flow $F_{AB}$ 904.

Like the packet sequence depicted in FIG. 18 the flow shown in 19 results from node A 801 sending 100 bytes of data on end point pair $EP_{A1}$ 907. Again, these 100 bytes are contained in a single packet 1901. Subsequent to receiving this packet 1901, node I 802 forwards the packet to node B 803 after modifying the packet headers to make it appear to node B 803 as if the packet had been sent from node I 802 on flow $F_{IB}$ 806. Unlike the packet exchange shown in FIG. 18 the exchange in FIG. 19 does not include an acknowledgment from node I 802 to node A 801 in response to data packet 1901 from node A 801 arriving at node I 802.

Like FIG. 18, FIG. 19 shows node B 803 generating an acknowledgment packet 1903 in response to the arrival of a packet 1902 from node I 802. As described earlier the splice mechanism creates packets containing data forwarded from node A 801 through node I 802 to node B 803 on flow $F_{AB}$ 904 that are acceptable to node B 803 as packets that originated at node I 802 and were sent to node B 803 via flow $F_{IB}$ 806. When the acknowledgment packet 1903 arrives at node I 802, node I 802 modifies the packet to make it appear to node A 801 that the packet originated at node I 802 and is associated with flow $F_{AI}$ 804. Node I 802 then forwards the modified packet 1904 to node A 801.

The temporal order of the packets in FIG. 19 is the only one consistent with a spliced flow. That is, for a spliced flow packet 1904 is not sent from node I 802 before packet 1903 arrives at node I 802, and packet 1902 is not sent from node I 802 before packet 1901 arrives at node I 802. Packet 1903 is not sent from node B 803 before packet 1902 arrives at node B 803 simply to conform with the TCP protocol.

By itself this temporal ordering is not sufficient proof of a flow splice as it is also possible for this order to result without a splice. The presence of a flow splice is conclusively indicated by causality between packets received by and sent by the intermediate node I 802 on which the splice is performed. Specifically, in the scenario with a flow splice depicted in FIG. 19, the sending of acknowledgment packet 1904 by node I 802 is caused by the arrival of acknowledgment packet 1903 from node B 803 and not by the arrival of data packet 1901 from node A 801.

This causality is refuted if node I 802 sends an acknowledgment to node A 801 for data packet 1901 before an acknowledgment is received at node I 802 for the corresponding data packet 1902 sent from node I 802 to node B 803. The causality indicative of a flow splice is confirmed if node I 802 fails to send an acknowledgment to node A 801 for packet 1901 if it does not receive the acknowledgment packet 1903 from node B 803 for the corresponding packet 1902.

The causality indicative of a flow splice can also be confirmed a different way. In the scenario without a flow splice depicted in FIG. 18 the ACK number in packet 1802 is set by node I 802 to one more than the greatest sequence number I 802 has received from A 801 on flow $F_{AI}$ 804 as mandated by the TCP protocol. In the case depicted in FIG. 19, node I 802 received from A 801 100 bytes starting at sequence number 1000 in packet 1801. Packet 1801 contains sequence numbers 1000 through 1099. Node I 802 therefore sets the ACK number in packet 1802 to 1100.

In the scenario with a splice depicted in FIG. 19 the ACK number in packet 1904 is set by node I 802 to the ACK number in the corresponding packet 1903 minus the sequence number delta value for the splice following the algorithm for splice processing. The sequence number delta value for a splice is defined as the sequence number of a byte sent by the intermediate node to the splice destination minus the sequence number of the corresponding byte when received from the splice source. For example the first of the 100 bytes in packet 1902, sent from node I 802 to node B 803, has sequence number 2000. The corresponding byte was sent from node A 801 to node I 802 in packet 1901 with sequence number 1000. This the sequence number delta for this splice is therefore 2000 minus 1000 or 1000. Thus when node I 802 receives acknowledgment packet 1903 from node B 803 it subtracts 1000 from the ACK number 2100 and sets the ACK number in the forwarded packet 1904 to 1100.

Although the ACK number in each of packets 1802 and 1904 are set according to distinct algorithms, both algorithms produced the same value 1100. The flow splice processing is, in fact, required to produce the same ACK numbers as produced by normal TCP processing if it is to remain transparent to the splice source and destination. Although under normal operation the two algorithms produce the same ACK number, the specific algorithm in use at a particular intermediate node can be determined by modifying the acknowledgment packets sent to the intermediate node.

For example to determine if a flow splice has been created at node I 802, we simply add some amount to the ACK number in the acknowledgment packet 1903 sent by node B 803. If a flow splice is not present this modification will have no effect on the ACK number in the acknowledgment packet 1904 sent by the intermediate node I 802. If a flow splice is present, however, the ACK number in the acknowledgment packet 1904 sent by the intermediate node I 802 will reflect the modification to the ACK number in the acknowledgment packet sent by the destination node B 803.

If 1000 is added to the ACK number in the acknowledgment packet 1903 sent by the destination node B 803, the presence of a flow splice is indicated if the ACK number in the corresponding acknowledgment packet 1904 sent by the intermediate node I 802 is also 1000 more than would be expected according to the TCP algorithm. It is certain the TCP algorithm did not generate the acknowledgment packet sent by the intermediate node I 802 if the ACK number in the packet corresponds to data not yet received by the intermediate node I 802.

It is noted that this invention may be used for many applications. Although the description is made for particular arrangements and applications, the intent and concept of the invention is suitable and applicable to other arrangements and applications. It will be clear to those skilled in the art that other modifications to the disclosed embodiments can be effected without departing from the spirit and scope of the invention.

What is claimed is:

1. A method for processing network packets at an intermediate node, the method comprising:

forming a first connection between a first node and the intermediate node this first connection including:

a first flow originating at a first source flow end point on the first node and terminating at a first destination flow end point on the intermediate node, wherein processing at the first node associated with the first source flow end point conforms to a first protocol, and a second flow originating at a second source flow end point on the intermediate node and terminating at a second destination flow end point on the first node, wherein processing at the first node associated with the second destination flow end point conforms to a second protocol;

forming a second connection between a second node and the intermediate node this second connection including:

a third flow originating at a third source flow end point on the intermediate node and terminating at a third destination flow end point on the second node, wherein processing at the second node associated with the third destination flow end point conforms to a third protocol, and a fourth flow originating at a fourth source flow end point on the second node and terminating at a fourth destination flow end point on the intermediate node, wherein processing at the second node associated with the fourth source flow end point conforms to a fourth protocol, such that a given flow originates at a source flow end point on a source node and terminates at a destination flow end point on a destination node and data written to the source flow end point of a given flow can subsequently be read from the destination flow end point of the given flow without traversing any intervening flow end points, and splicing the first flow and third flow to form a first composite flow originating at the first source flow end point on the first node and terminating at the third destination flow end point on the second node in a manner whereby the second flow and the fourth flow remain unchanged.

2. A method as recited in claim 1, wherein the step of splicing the first flow and third flow to form the first composite flow allows processing at the first node associated with the first source flow end point to remain unmodified and continue to conform to the first protocol, processing at the first node associated with the second destination flow end point to remain unmodified and continue to conform to the second protocol, processing at the second node associated with the third destination flow end point to remain unmodified and continue to conform to the third protocol, and processing at the second node associated with the fourth source flow end point to remain unmodified and continue to conform to the fourth protocol.

3. A method according to claim 1, wherein the first source flow end point, the second destination flow end point, the third destination flow end point and the fourth source flow end point all reside on the same device.

4. A method according to claim 1, wherein the first node source flow end point, the first destination flow end point, the second source flow end point and the second destination flow end point all reside on the same device.

5. A method according to claim 1, wherein the second source flow end point, the first destination flow end point, the third source flow end point, and the fourth destination flow endpoint all reside on the same device.

6. A method recited in claim 1, wherein the first source flow endpoint, the second source flow end point, the third source flow endpoint, the fourth, source flow end point, the first destination flow end point, the second destination flow end point, the third destination flow end point and the fourth destination flow end point, all reside on the same device.

7. A method recited in claim 1, wherein the first protocol and the second protocol are the same protocol.

8. A method recited in claim 1, wherein the third protocol and the fourth protocol are the same protocol.

9. A method recited in claim 1, wherein the first protocol, the second protocol, the third protocol, and the fourth protocol are all the same protocol.

10. A method recited in claim 1, wherein the step of splicing the first flow and third flow to form the first composite flow includes:

identifying a first set of packets received from the first node including all packets containing information pertaining to the first source flow end point and all packets containing information pertaining to the second destination flow end point and performing the following four steps (a), (b), (c) and (d) on each packet in this first set of packets;

(a) processing any information in the packet pertaining to the second flow according to the second protocol;

(b) replacing any information in the packet pertaining to the second flow with the corresponding information pertaining to the fourth flow;

(c) modifying the packet so that any information in the packet pertaining to the flow from the first source flow end point will appear to the second node as pertaining to the flow to the third destination flow end point thus establishing a correspondence between data received by the intermediate node from the first source flow end point and data sent by the intermediate node to the third destination flow end point, and (d) sending each packet so processed to the second node;

identifying a second set of packets received from the second node including all packets containing information pertaining to the third destination flow end point and all packets containing information pertaining to the fourth source flow end point and performing the following steps (d), (e), and (f), on each packet in this second set of packets;

(d) identifying any information in the packet pertaining to the fourth flow and processing such information according to the fourth protocol;

(e) modifying any information in the packet pertaining to the flow to the third destination flow end point so the information instead pertains to the flow from the first source flow end point according to the correspondence between data received by the intermediate node from the first source flow end point and data sent by the intermediate node to the third destination flow end point established in step (b);

(f) sending to the first node zero or more packets containing any information resulting from step (e).

11. A method recited in claim 10, wherein step (c) includes determining if the packet to be sent should be fragmented and fragmenting it if so.

12. A method recited in claim 10, further comprising determining if each packet in the first set of packets contains data written to the first source flow end point and nullifying steps (b), (c) and (d) if not.

13. A method recited in claim 10, further comprising determining if each packet in the second set of packets contains data written to the fourth source flow end point, determining if each packet in the second set of packets contains no information pertaining to the flow to the third destination flow end point that has not already been processed by a previous application of step (e), and nullifying steps (e) and (f) for a given packet if both determinations are true for the given packet.

14. A method recited in claim 10, wherein each of the first protocol, the second protocol, the third protocol and the fourth protocol are Transmission Control Protocol (TCP) in conjunction with either version 4 or version 6 of Internet Protocol (IP) and wherein step (c) of claim 1, includes the following steps (a), (b), (c), (d), and (e):
  (a) setting the source IP address in the IP header to the local IP address associated with the third source flow end point;
  (b) setting the destination IP address in the IP header to the remote IP address associated with the third source flow end point;
  (c) setting the source port number in the TCP header to the local port number associated with the third source flow end point;
  (d) setting the destination port number in the TCP header to the remote port number associated with the third source flow end point, and
  (e) modifying the sequence (SEQ) number in the TCP header;
and wherein step (b) of claim 10, includes the following steps (f), (g), (h), and (i):
  (f) replacing the acknowledgment (ACK) number in the TCP header;
  (g) replacing the window value in the TCP header;
  (h) modifying or recalculating the TCP checksum in the TCP header, and
  (i) modifying or recalculating the IP checksum in the IP header;
and wherein step (e) of claim 1, includes the following steps (j), (k), (l), (m), (n), (o), (p) and (q):
  (j) setting the source IP address in the IP header to the local IP address associated with the first destination flow end point;
  (k) setting the destination IP address in the IP header to the remote IP address associated with the first destination flow end point;
  (l) setting the source port number in the TCP header to the local port number associated with the first destination flow end point;
  (m) setting the destination port number in the TCP header to the remote port number associated with the first destination flow end point;
  (n) replacing the sequence (SEQ) number in the TCP header;
  (o) modifying the acknowledgment (ACK) number in the TCP header;
  (p) modifying the TCP checksum in the TCP header, and
  (q) modifying the IP checksum in the IP header.

15. A method recited in claim 14, wherein any of the checksum calculations performed in steps (h), (i), (p), and (q) is calculated by adjusting the original checksum to account for changes made to the packet at the intermediate node.

16. A method recited in claim 14, wherein the first connection extends between a TCP server on the first node and a SOCKS server on the intermediate node and the second connection extends between the SOCKS server on the intermediate node and a SOCKS client on the second node further comprising parsing data received from either the SOCKS client or the TCP server.

17. A method recited in claim 14, wherein the first connection extends between a SOCKS client on the first node and a SOCKS server on the intermediate node and the second connection extends between the SOCKS server on the intermediate node and a TCP server on the second node further comprising parsing data received from either the SOCKS client or the TCP server.

18. A method recited in claim 14, wherein the first connection extends between a Sun remote procedure call (Sun RPC) server on the first node and a proxy on the intermediate node and the second connection extends between the proxy on the intermediate node and a Sun RPC client on the second node further comprising parsing data received from either the Sun RPC client or the Sun RPC server.

19. A method recited in claim 14, wherein the first connection extends between a Sun remote procedure call (Sun RPC) client on the first node and a proxy on the intermediate node and the second connection extends between the proxy on the intermediate node and a Sun RPC server on the second node further comprising parsing data received from either the Sun RPC client or the Sun RPC server.

20. A method recited in claim 14, wherein the first connection extends between a hypertext transfer protocol (HTTP) server on the first node and a proxy on the intermediate node and the second connection extends between the proxy on the intermediate node and an HTTP client on the second node further comprising parsing data received from either the HTTP client or the HTTP server.

21. A method recited in claim 14, wherein the first connection extends between a hypertext transfer protocol (HTTP) client on the first node and a proxy on the intermediate node and the second connection extends between the proxy on the intermediate node and an HTTP server on the second node further comprising parsing data received from either the HTTP client or the HTTP server.

22. A method recited in claim 14, wherein the first connection extends between a file transfer protocol (FTP) server on the first node and a proxy on the intermediate node and the second connection extends between the proxy on the intermediate node and an FTP client on the second node further comprising parsing data received from either the FTP client or the FTP server.

23. A method recited in claim 14, wherein the first connection extends between a file transfer protocol (FTP) client on the first node and a proxy on the intermediate node and the second connection extends between the proxy on the intermediate node and an FTP server on the second node further comprising parsing data received from either the FTP client or the FTP server.

24. A method recited in claim 14, wherein the first connection extends between a telnet server on the first node and a proxy on the intermediate node and the second connection extends between the proxy on the intermediate node and an telnet client on the second node further comprising parsing data received from either the telnet client or the telnet server.

25. A method recited in claim 24 wherein the first connection extends between a client reading streaming audio and/or video on the first node and a proxy on the intermediate node and the second connection extends between the proxy on the intermediate node and a server sending streaming audio or video on the second node further comprising parsing data received from either the client or the server.

26. A method recited in claim 14, wherein the first connection extends between a telnet client on the first node and a proxy on the intermediate node and the second connection extends between the proxy on the intermediate node and an telnet server on the second node further comprising parsing data received from either the telnet client or the telnet server.

27. A method recited in claim 14, wherein the first connection extends between a network news transfer protocol (NNTP) server on the first node and a proxy on the intermediate node and the second connection extends between the proxy on the intermediate node and an NNTP client on the second node further comprising parsing data received from either the NNTP client or the NNTP server.

28. A method recited in claim 14, wherein the first connection extends between a network news transfer protocol (NNTP) client on the first node and a proxy on the intermediate node and the second connection extends between the proxy on the intermediate node and an NNTP server on the second node further comprising parsing data received from either the NNTP client or the NNTP server.

29. A method recited in claim 14, wherein the first connection extends between a secure shell (SSH) server on the first node and a proxy on the intermediate node and the second connection extends between the proxy on the intermediate node and an SSH client on the second node further comprising parsing data received from either the SSH client or the SSH server.

30. A method recited in claim 14, wherein the first connection extends between a secure shell (SSH) client on the first node and a proxy on the intermediate node and the second connection extends between the proxy on the intermediate node and an SSH server on the second node further comprising parsing data received from either the SSH client or the SSH server.

31. A method recited in claim 14, wherein the first connection extends between a remote shell (RSH) server on the first node and a proxy on the intermediate node and the second connection extends between the proxy on the intermediate node and an RSH client on the second node further comprising parsing data received from either the RSH client or the RSH server.

32. A method recited in claim 14, wherein the first connection extends between a remote shell (RSH) client on the first node and a proxy on the intermediate node and the second connection extends between the proxy on the intermediate node and an RSH server on the second node further comprising parsing data received from either the RSH client or the RSH server.

33. A method recited in claim 14, wherein the first connection extends between a simple mail transfer protocol (SMTP) server on the first node and a proxy on the intermediate node and the second connection extends between the proxy on the intermediate node and an SMTP client on the second node further comprising parsing data received from either the SMTP client or the SMTP server.

34. A method recited in claim 14, wherein the first connection extends between a simple mail transfer protocol (SMTP) client on the first node and a proxy on the intermediate node and the second connection extends between the proxy on the intermediate node and an SMTP server on the second node further comprising parsing data received from either the SMTP client or the SMTP server.

35. A method recited in claim 14, wherein the first connection extends between a post office protocol (POP) server on the first node and a proxy on the intermediate node and the second connection extends between the proxy on the intermediate node and a POP client on the second node further comprising parsing data received from either the POP client or the POP server.

36. A method recited in claim 14, wherein the first connection extends between a post office protocol (POP) client on the first node and a proxy on the intermediate node and the second connection extends between the proxy on the intermediate node and a POP server on the second node further comprising parsing data received from either the POP client or the POP server.

37. A method recited in claim 14, wherein the first connection extends between a server sending streaming audio and or video on the first node and a proxy on the intermediate node and the second connection extends between the proxy on the intermediate node and a client receiving streaming audio or video on the second node further comprising parsing data received from either the client or the server.

38. A method recited in claim 1, wherein the first protocol and the third protocol each associate a sequence number with each byte, packet or other unit of data sent across a flow further comprising the step of maintaining a one to one mapping between sequence numbers associated by the first protocol with each byte, packet, or other unit of data received by the intermediate node from the first source flow end point and sequence numbers associated by the second protocol with each byte, packet, or other unit of data sent by the intermediate node to the third destination flow end point.

39. A method recited in claim 1, further comprising the step of sending data stored in buffers associated with the third source flow end point to the third destination flow end point according to the third protocol.

40. A method recited in claim 1, further comprising the step of sending data stored in buffers associated with the first destination flow end point to the third destination flow end point according to the third protocol.

41. A method recited in claim 1, further comprising the step of determining if the first node has shut down the flow originating at the first source flow end point and shutting down the flow terminating at the third destination flow end point if this determination is true.

42. A method recited in claim 1, further comprising determining if the first node has shut down the flow originating at the first source flow end point and eliminating the first composite flow and recreating the third flow if this determination is true.

43. A method recited in claim 1, further comprising the step of making a copy of data received from the first node by the intermediate node such that the copy may subsequently be read at the intermediate node.

44. A method recited in claim 1, further comprising the steps of:
   reading an amount of data from the fourth destination flow end point;
   storing the amount of data in a format satisfying a need from the group of needs consisting of:
   reducing the number of bits required to store the data,
   encrypting the data, reducing the number or amount of resources required to transmit the data,
   reducing the number or amount of resources required to display the data, and
   any combination of these needs; and
   sending the stored data to the first node.

45. A method recited in claim 1, further comprising:

forming a third connection between a third node and the intermediate node the third connection including:

a fifth flow originating at a fifth source flow end point on the intermediate node and terminating at a fifth destination flow end point on the third node, wherein processing at the third node associated with the fifth destination flow end point conforms to a fifth protocol, and a sixth flow originating at a sixth source flow end point on the third node and terminating at a sixth destination flow end point on the intermediate node, wherein processing at the sixth node associated with the fourth source flow end point conforms to a sixth protocol, splicing the sixth flow and second flow to form a third composite flow originating at the sixth source flow end point on the third node and terminating at the second destination flow end point on the first node in a manner whereby the fourth flow and the fifth flow remain unchanged.

46. A method recited in claim 1, further comprising the step of reading data from the first destination flow end point prior to the step of splicing.

47. A method recited in claim 1, further comprising the step of writing data to the third source flow end point prior to the step of splicing.

48. A method recited in claim 1, further comprising the step of determining if the step of splicing should be performed based on a criterion selected from the group of criteria consisting of:

data read from the first destination flow end point,
data read from the fourth destination flow end point,
data written to the second source flow end point,
data written to the third source flow end point,
an address associated with the first node,
an address associated with the second node,
an address associated with the intermediate node,
an address associated with the first flow,
an address associated with the second flow,
an address associated with the third flow,
an address associated with the fourth flow,
an estimate of the available bandwidth along the first flow,
an estimate of the available bandwidth along the second flow,
an estimate of the available bandwidth along the third flow,
an estimate of the available bandwidth along the fourth flow,
an estimate of the end to end latency associated with the first flow,
an estimate of the end to end latency associated with the second flow,
an estimate of the end to end latency associated with the third flow,
an estimate of the end to end latency associated with the fourth flow,
a receive window size advertised by the first node,
a receive window size advertised by the second node,
a receive window size advertised by the intermediate node,
a number of network hops between the first node and the intermediate node,
a number of network hops between the intermediate node and the second node,
a number of network hops between the first node and the second node,
a protocol associated with the first flow,
a protocol associated with the second flow,
a protocol associated with the third flow,
a protocol associated with the fourth flow,
an estimate of the amount of data that will be written to the first source flow end point,
an estimate of the amount of data that will be written to the second source flow end point,
an estimate of the amount of data that will be written to the third source flow end point,
an estimate of the amount of data that will be written to the fourth source flow end point,
configuration information stored at or accessible from the intermediate node,
information received from the first node pertaining to quality of service,
information received from the second node pertaining to quality of service, and
any combination of these criteria.

49. A method recited in claim 1, further comprising the step of determining the network addresses with which the first flow, second flow, third flow, and fourth flow are established based on a criterion selected from the group of criteria consisting of:

data read from the first destination flow end point,
data read from the fourth destination flow end point,
data written to the second source flow end point,
data written to the third source flow end point,
a network address associated with a potential or actual first node,
a network address associated with a potential or actual second node,
a network address associated with the intermediate node,
an address associated with the first flow,
an address associated with the second flow,
an address associated with the third flow,
an address associated with the fourth flow,
an estimate or prediction of the available bandwidth along the first flow
an estimate or prediction of the available bandwidth along the second flow,
an estimate or prediction of the available bandwidth along the third flow
an estimate or prediction of the available bandwidth along the fourth flow,
an estimate or prediction of the end to end latency along the first flow,
an estimate or prediction of the end to end latency along the second flow,
an estimate or prediction of the end to end latency along the third flow,
an estimate or predication of the end to end latency along the fourth flow,
a receive window size advertised by the first node,
a receive window size advertised by the second node,
a receive window size advertised by the intermediate node,
a number of network hops between the first node and the intermediate node,
a number of network hops between the intermediate node and the second node,
a number of hops between the first node and the second node,
a protocol associated with the first flow,
A protocol associated with the second flow,
an estimate of the amount of data that will be written to the first source flow end point, an estimate of the amount of data that will be written to the second source flow end point,
an estimate of the amount of data that will be written to the third source flow end point,
an estimate of the amount of data that will be written to the fourth source flow end point,
configuration information stored at or accessible from the intermediate node,
information received from the first node pertaining to quality of service,
information received from the second node pertaining to quality of service, and
any combination of these criteria.

50. A method recited in claim 1, further comprising:
forming a third connection between a third node and the intermediate node the third connection including:
a fifth flow originating at a fifth source flow end point on the intermediate node and terminating at a fifth destination flow end point on the third node, wherein processing at the third node associated with the fifth destination flow end point conforms to a fifth protocol, and
a sixth flow originating at a sixth source flow end point on the third node and terminating at a sixth destination flow end point on the intermediate node, wherein processing at the sixth node associated with the fourth source flow end point conforms to a sixth protocol,
splicing the fourth flow and fifth flow to form a second composite flow originating at the fourth source flow end point on the second node and terminating at the fifth destination flow end point on the third node in a manner whereby the second flow and the sixth flow remain unchanged.

51. An apparatus comprising:
a first node, a second node, an intermediate node;
a first processor that forms a first connection between a first node and the intermediate node the first connection including:
a first flow originating at a first source flow end point on the first node and terminating at a first destination flow end point on the intermediate node, wherein processing at the first node associated with the first source flow end point conforms to a first protocol, and
a second flow originating at a second source flow end point on the intermediate node and terminating at a second destination flow end point on the first node, wherein processing at the first node associated with the second destination flow end point conforms to a second protocol;
a second processor that forms a second connection between a second node and the intermediate node the second connection including:
a third flow originating at a third source flow end point on the intermediate node and terminating at a third destination flow end point on the second node, wherein processing at the second node associated with the third destination flow end point conforms to a third protocol, and
a fourth flow originating at a fourth source flow end point on the second node and terminating at a fourth destination flow end point on the intermediate node, wherein processing at the second node associated with the fourth source flow end point conforms to a fourth protocol,
such that a given flow originates at a source flow end point on a source node and terminates at a destination flow end point on a destination node and data written to the source flow end point of a given flow can subsequently be read from the destination flow end point of the given flow without traversing any intervening flow end points, and
a third processor that splices the first flow and third flow to form a first composite flow originating at the first source flow end point on the first node and terminating at the third destination flow end point on the second node in a manner whereby the second flow and the fourth flow remain unchanged.

52. An article of manufacture comprising a computer usable medium having computer readable program code means embodied therein for causing the processing of network packets at an intermediate node, the computer readable program code means in said article of manufacture comprising computer readable program code means for causing a computer to effect:
forming a first connection between a first node and the intermediate node this first connection including:
a first flow originating at a first source flow end point on the first node and terminating at a first destination flow end point on the intermediate node, wherein processing at the first node associated with the first source flow end point conforms to a first protocol, and
a second flow originating at a second source flow end point on the intermediate node and terminating at a second destination flow end point on the first node, wherein processing at the first node associated with the second destination flow end point conforms to a second protocol;
forming a second connection between a second node and the intermediate node this second connection including:
a third flow originating at a third source flow end point on the intermediate node and terminating at a third destination flow end point on the second node, wherein processing at the second node associated with the third destination flow end point conforms to a third protocol, and
a fourth flow originating at a fourth source flow end point on the second node and terminating at a fourth destination flow end point on the intermediate node, wherein processing at the second node associated with the fourth source flow end point conforms to a fourth protocol,
such that a given flow originates at a source flow end point on a source node and terminates at a destination flow end point on a destination node and data written to the source flow end point of a given flow can subsequently be read from the destination flow end point of the given flow without traversing any intervening flow end points, and
splicing the first flow and third flow to form a first composite flow originating at the first source flow end point on the first node and terminating at the third destination flow end point on the second node in a manner whereby the second flow and the fourth flow remain unchanged.

53. An article of manufacture as recited in claim 52, wherein the step of splicing the first flow and third flow to form the first composite flow allows:
processing at the first node associated with the first source flow end point to remain unmodified and continue to conform to the first protocol,
processing at the first node associated with the second destination flow end point to remain unmodified and continue to conform to the second protocol, processing at the second node associated with the third destination flow end point to remain unmodified and continue to conform to the third protocol, and processing at the second node associated with the fourth source flow end point to remain unmodified and continue to conform to the fourth protocol.

54. An article of manufacture according to claim 52, wherein the first source flow end point, the second destination flow end point, the third destination flow end point, and the fourth source flow end point all reside on the same device.

55. An article of manufacture as recited in claim 52, wherein the first protocol and the third protocol each associate a sequence number with each byte, packet or other unit of data sent across a flow, the computer readable program code means in said article of manufacture further comprising computer readable program code means for causing a computer to effect maintaining a one to one mapping between sequence numbers associated by the first protocol with each byte, packet, or other unit of data received by the intermediate node from the first source flow end point and sequence numbers associated by the second protocol with each byte, packet, or other unit of data sent by the intermediate node to the third destination flow end point.

56. An article of manufacture as recited in claim 52, wherein the step of splicing the first flow and third flow to form the first composite flow includes:

identifying a first set of packets received from the first node including all packets containing information pertaining to the first source flow end point and all packets containing information pertaining to the second destination flow end point and performing the following four steps (a), (b), (c) and (d) on each packet in this first set of packets;

(a) processing any information in the packet pertaining to the second flow according to the second protocol;

(b) replacing any information in the packet pertaining to the second flow with the corresponding information pertaining to the fourth flow;

(c) modifying the packet so that any information in the packet pertaining to the flow from the first source flow end point will appear to the second node as pertaining to the flow to the third destination flow end point thus establishing a correspondence between data received by the intermediate node from the first source flow end point and data sent by the intermediate node to the third destination flow end point, and (d) sending each packet so processed to the second node;

identifying a second set of packets received from the second node including all packets containing information pertaining to the third destination flow end point and all packets containing information pertaining to the fourth source flow end point and performing the following steps (d), (e), and (f), on each packet in this second set of packets;

(d) identifying any information in the packet pertaining to the fourth flow and processing such information according to the fourth protocol;

(e) modifying any information in the packet pertaining to the flow to the third destination flow end point so the information instead pertains to the flow from the first source flow end point according to the correspondence between data received by the intermediate node from the first source flow end point and data sent by the intermediate node to the third destination flow end point established in step (b);

(f) sending to the first node zero or more packets containing any information resulting from step (e).

57. An article of manufacture as recited in claim 56, wherein each of the first protocol, the second protocol, the third protocol and the fourth protocol are Transmission Control Protocol (TCP) in conjunction with either version 4 or version 6 of Internet Protocol (IP) and wherein step (c) of claim 1, includes the following steps (a), (b), (c), (d), and (e):

(a) setting the source IP address in the IP header to the local IP address associated with the third source flow end point;

(b) setting the destination IP address in the IP header to the remote IP address associated with the third source flow end point;

(c) setting the source port number in the TCP header to the local port number associated with the third source flow end point;

(d) setting the destination port number in the TCP header to the remote port number associated with the third source flow end point, and (e) modifying the sequence (SEQ) number in the TCP header;

and wherein step (b) of claim 10, includes the following steps (f), (g), (h), and (i):

(f) replacing the acknowledgment (ACK) number in the TCP header;

(g) replacing the window value in the TCP header;

(h) modifying or recalculating the TCP checksum in the TCP header, and (i) modifying or recalculating the IP checksum in the IP header;

and wherein step (e) of claim 1, includes the following steps (j), (k), (l), (m), (n), (o), (p) and (q):

(j) setting the source IP address in the IP header to the local IP address associated with the first destination flow end point;

(k) setting the destination IP address in the IP header to the remote IP address associated with the first destination flow end point;

(l) setting the source port number in the TCP header to the local port number associated with the first destination flow end point;

(m) setting the destination port number in the TCP header to the remote port number associated with the first destination flow end point;

(n) replacing the sequence (SEQ) number in the TCP header;

(o) modifying the acknowledgment (ACK) number in the TCP header;

(p) modifying the TCP checksum in the TCP header, and (q) modifying the IP checksum in the IP header.

58. A computer program product comprising a computer usable medium having computer readable program code means embodied therein for causing the processing of network packets at an intermediate node, the computer readable program code means in said computer program product comprising computer readable program code means for causing a computer to effect:

forming a first connection between a first node and the intermediate node this first connection including:

a first flow originating at a first source flow end point on the first node and terminating at a first destination flow end point on the intermediate node, wherein processing at the first node associated with the first source flow end point conforms to a first protocol, and a second flow originating at a second source flow end point on the intermediate node and terminating at a second destination flow end point on the first node, wherein processing at the first node associated with the second destination flow end point conforms to a second protocol;

forming a second connection between a second node and the intermediate node this second connection including:

a third flow originating at a third source flow end point on the intermediate node and terminating at a third destination flow end point on the second node, wherein processing at the second node associated with the third destination flow end point conforms to a third protocol, and a fourth flow originating at a fourth source flow end point on the second node and terminating at a fourth destination flow end point on the intermediate node, wherein processing at the second node associated with the fourth source flow end point conforms to a fourth protocol, such that a given flow originates at a source flow end point on a source node and terminates at a destination flow end point on a destination node and data written to the source flow end point of a given flow can subsequently be read from the destination flow end point of the given flow without traversing any intervening flow end points, and splicing the first flow and third flow to form a first composite flow originating at the first source flow end point on the first node and terminating at the third destination flow end point on the second node in a manner whereby the second flow and the fourth flow remain unchanged.

* * * * *